US012729302B2

(12) United States Patent
Vodovotz et al.

(10) Patent No.: US 12,729,302 B2
(45) Date of Patent: Sep. 8, 2026

(54) BIO-BASED POLYMER COMPOSITIONS AND METHODS OF MAKING AND USING THEREOF

(71) Applicant: Ohio State Innovation Foundation, Columbus, OH (US)

(72) Inventors: Yael Vodovotz, Columbus, OH (US); Katrina Cornish, Wooster, OH (US); Kurt Koelling, Powell, OH (US); Xiaoying Zhao, Columbus, OH (US); Varun Venoor, Lowell, MA (US)

(73) Assignee: Ohio State Innovation Foundation, Columbus, OH (US)

( * ) Notice: Subject to any disclaimer, the term of this patent is extended or adjusted under 35 U.S.C. 154(b) by 733 days.

(21) Appl. No.: 17/311,631

(22) PCT Filed: Dec. 9, 2019

(86) PCT No.: PCT/US2019/065265
§ 371 (c)(1),
(2) Date: Jun. 7, 2021

(87) PCT Pub. No.: WO2020/118303
PCT Pub. Date: Jun. 11, 2020

(65) Prior Publication Data

US 2022/0025174 A1 Jan. 27, 2022

Related U.S. Application Data

(60) Provisional application No. 62/776,755, filed on Dec. 7, 2018.

(51) Int. Cl.
*C08L 67/04* (2006.01)
*C08J 3/00* (2006.01)

(52) U.S. Cl.
CPC ............... *C08L 67/04* (2013.01); *C08J 3/005* (2013.01); *C08J 2367/04* (2013.01);
(Continued)

(58) Field of Classification Search
CPC .................................. C08L 67/04; C08J 3/005
See application file for complete search history.

(56) References Cited

U.S. PATENT DOCUMENTS 4,477,654 A 10/1984 Holmes et al.
5,723,730 A 3/1998 Montgomery et al.
(Continued)

FOREIGN PATENT DOCUMENTS

WO 98/04713 2/1998
WO 2009/129499 10/2009
(Continued)

OTHER PUBLICATIONS

Chen Y, Yuan D, Xu C. Dynamically vulcanized biobased polylactide/natural rubber blend material with continuous cross-linked rubber phase. ACS applied materials & interfaces. Mar. 26, 2014;6(6):3811-6. (Year: 2014).*

(Continued)

*Primary Examiner* — Robert C Boyle
(74) *Attorney, Agent, or Firm* — Meunier Carlin & Curfman LLC

(57) ABSTRACT

Disclosed are polymeric compositions comprising polyhydroxyalkanoates. These compostions can comprise a blend comprising a polyhydroxyalkanoate (PHA) polymer, and a rubber polymer. The blend can comprise a biphasic mixture comprising a first phase comprising the PHA polymer, and a second phase comprising the rubber polymer dispersed with the first phase. The rubber polymer can be crosslinked, for example, through reaction with a free radical initiator. By incorporating the dynamically crosslinked rubber polymer,
(Continued)

Melt PHBV
Crystallization with rubber as nuclei
Large rubber droplets cause reduced crystallinity
• Rubber PHBV the polymer composition can exhibit one or more improved characteristics relative to PHA alone, including improved thermal stability, improved melt strength, improved flexibility, improved toughness, or a combination thereof. Also provided are articles formed at least in part from these polymeric compositions, as well as methods of making these polymeric compositions.

16 Claims, 16 Drawing Sheets

(52) U.S. Cl.
CPC ....... *C08J 2407/00* (2013.01); *C08L 2201/06* (2013.01); *C08L 2205/12* (2013.01); *C08L 2312/00* (2013.01)

(56) References Cited

U.S. PATENT DOCUMENTS

| | | | |
|---|---|---|---|
| 6,316,262 | B1 | 11/2001 | Huisman et al. |
| 6,689,589 | B2 | 2/2004 | Huisman et al. |
| 6,759,219 | B2 | 7/2004 | Hein et al. |
| 6,984,694 | B2 | 1/2006 | Blasius et al. |
| 7,229,804 | B2 | 6/2007 | Huisman et al. |
| 2002/0164729 | A1 | 11/2002 | Skraly et al. |
| 2004/0220355 | A1 | 11/2004 | Whitehouse |
| 2005/0209377 | A1 | 9/2005 | Padwa |
| 2017/0245494 | A1 | 8/2017 | Bardosh et al. |

FOREIGN PATENT DOCUMENTS

| | | |
|---|---|---|
| WO | 2010/008445 | 1/2010 |
| WO | 2010/068953 | 6/2010 |

OTHER PUBLICATIONS

Han CC, Ismail J, Kammer HW. Melt reaction in blends of poly (3-hydroxybutyrate-co-3-hydroxyvalerate) and epoxidized natural rubber. Polymer degradation and stability. Sep. 1, 2004;85(3):947-55. (Year: 2004).*

Zhang C, Man C, Pan Y, Wang W, Jiang L, Dan Y. Toughening of polylactide with natural rubber grafted with poly (butyl acrylate). Polymer International. Oct. 2011;60(10):1548-55. (Year: 2011).*

Yang J, Nie S, Zhu J. A comparative study on different rubbery modifiers: Effect on morphologies, mechanical, and thermal properties of PLA blends. Journal of Applied Polymer Science. May 5, 2016;133(17). (Year: 2016).*

Jaratrotkamjorn R, Khaokong C, Tanrattanakul V. Toughness enhancement of poly (lactic acid) by melt blending with natural rubber. Journal of Applied Polymer Science. Jun. 15, 2012;124(6):5027-36. (Year: 2012).*

Zhang C, Wang W, Huang Y, Pan Y, Jiang L, Dan Y, Luo Y, Peng Z. Thermal, mechanical and rheological properties of polylactide toughened by expoxidized natural rubber. Materials & Design. Mar. 1, 2013;45:198-205 ("Zhang ENR") (Year: 2013).*

Zhang, K. et al., Toughened sustainable green composites from poly (3-hydroxybutyrate-co-3-hydroxyvalerate) based ternary blends and miscanthus biofiber, 2 ACS Sustainable Chem. & Engâg 2345 (Year: 2014).*

Modi, Journal of Applied Polymer Science, vol. 133, Issue 37, Oct. 2016, 43937, p. 1-9. (Year: 2016).*

Coelho, Journal of Applied Polymers Science, volum 116, issue 2, Apr. 2010, p. 718-726 (Year: 2010).*

International Search Report and Written Opinion issued by the International Searching Authority (ISA/US) in PCT Application No. PCT/US2019/065265 on Feb. 21, 2020. 10 pages.

Thepthawat, Apicha, and Kawee Srikulkit. "Improving the properties of polylactic acid by blending with low molecular weight polylactic acid-g-natural rubber." Polymer Engineering & Science 54.12 (2014): 2770-2776.

Formela, Krzysztof, et al. "Reactive extrusion of bio-based polymer blends and composites-Current trends and future developments." Express Polymer Letters 12.1 (2018). p. 24-57.

International Preliminary Report on Patentability, dated Jun. 17, 2021.

Steinbüchel, Alexander, and Henry E. Valentin. "Diversity of bacterial polyhydroxyalkanoic acids." FEMS Microbiology letters 128.3 (1995): 219-228.

Lee, Seung Hwan, et al. "Production of poly (3-hydroxybutyrate-co-3-hydroxyhexanoate) by high-cell-density cultivation of Aeromonas hydrophila." Biotechnology and bioengineering 67.2 (2000): 240-244.

Park, Si Jae, et al. "Production of Poly (3-hydroxybutyrate-co-3-hydroxyhexanoate) by Metabolically Engineered *Escherichia c oli* Strains." Biomacromolecules 2.1 (2001): 248-254.

Matsusaki, Hiromi, Hideki Abe, and Yoshiharu Doi. "Biosynthesis and properties of poly (3-hydroxybutyrate-co-3-hydroxyalkanoates) by recombinant strains of *Pseudomonas* sp. 61-3." Biomacromolecules 1.1 (2000): 17-22.

Lee, Sang Yup. "Bacterial polyhydroxyalkanoates." Biotechnology and bioengineering 49.1 (1996): 1-14.

Braunegg, Gerhart, Gilles Lefebvre, and Klaus F. Genser. "Polyhydroxyalkanoates, biopolyesters from renewable resources: physiological and engineering aspects." Journal of biotechnology 65.2-3 (1998): 127-161.

ASTM D790-15 (2015) entitled "Standard Test Methods for Flexural Properties of Unreinforced and Reinforced Plastics and Electrical Insulating Materials."

ASTM D256-10 (2010) entitled "Standard Test Methods for Determining the Izod Pendulum Impact Resistance of Plastics."

ASTM D6866-18 (2018), entitled "Standard Test Methods for Determining the Biobased Content of Solid, Liquid, and Gaseous Samples Using Radiocarbon Analysis."

ASTM D6400-19 (2019) "Standard Specification for Labeling of Plastics Designed to be Aerobically Composted in Municipal or Industrial Facilities".

ASTM D3182-16 (2016), "Standard Practice for Rubber-Materials, Equipment, and Procedures for Mixing Standard Compounds and Preparing Standard Vulcanized Sheets".

ASTM D412-16 (2016) "Standard Test Methods for Vulcanized Rubber and Thermoplastic Elastomers—Tension."

ASTM D638-08 (2008) "Standard Test Method for Tensile Properties of Plastics."

Hopewell, Jefferson, Robert Dvorak, and Edward Kosior. "Plastics recycling: challenges and opportunities." Philosophical Transactions of the Royal Society B: Biological Sciences 364.1526 (2009): 2115-2126.

Eriksen, Marcus, et al. "Plastic pollution in the world's oceans: more than 5 trillion plastic pieces weighing over 250,000 tons afloat at sea." PloS one 9.12 (2014): e111913.

Azzarello, Marie Y., and Edward S. Van Vleet. "Marine birds and plastic pollution." Marine Ecology Progress Series 37.2/3 (1987): 295-303.

Seltenrich, Nate. "New link in the food chain? Marine plastic pollution and seafood safety." (2015): A34-A41.

Ivar do Sul, Juliana A., and Monica F. Costa. "Plastic pollution risks in an estuarine conservation unit." Journal of Coastal Research 65 (2013): 48-53.

Siracusa, Valentina, et al. "Biodegradable polymers for food packaging: a review." Trends in food science & technology 19.12 (2008): 634-643.

Jambeck, Jenna R., et al. "Plastic waste inputs from land into the ocean." Science 347.6223 (2015): 768-771.

Iavadim, Alireza, Shaoqin Gong SrikanthPilla, and Lih-Sheng Turng. "Polymer Blends and Biocomposites: Properties and Applications." Handbook of Bioplastics and Biocomposites Engineering Applications 24 (2011): 373. https://books.google.ro/books?hl=en&lr=&id=UX-9Z5jx-IsC&oi=fnd&pg=PA373&dq=Polymer+Blends+and+Biocomposites:+Properties+and+Applications&ots=08Kr9-TVWE&sig=bsE8B10LrJEDHChobE4qPyIWeCc&redir_esc=y#y=onepage&q=Polymer%20Blends%20and%20Biocomposites%3A%20Properties%20and%20Applications&f=false.

(56) References Cited

OTHER PUBLICATIONS

Carli, Larissa N., Janaina S. Crespo, and Raquel S. Mauler. "PHBV nanocomposites based on organomodified montmorillonite and halloysite: The effect of clay type on the morphology and thermal and mechanical properties." Composites Part A: Applied Science and Manufacturing 42.11 (2011): 1601-1608.
Modi, Sunny J., et al. "Mechanical and Rheological Properties of PHBV bioplastic composites engineered with invasive plant fibers." Transactions of the ASABE 59.6 (2016): 1883-1891.
Meng, Wan, et al. "Electrospun PHBV/collagen composite nanofibrous scaffolds for tissue engineering." Journal of Biomaterials Science, Polymer Edition 18.1 (2007): 81-94.
Chea, Vorleak, et al. "Poly (3-hydroxybutyrate-co-3-hydroxyvalerate) films for food packaging: Physical-chemical and structural stability under food contact conditions." Journal of Applied Polymer Science 133.2 (2016).
Mekonnen, Tizazu, et al. "Progress in bio-based plastics and plasticizing modifications." Journal of Materials Chemistry A 1.43 (2013): 13379-13398.
Maddah, Hisham A. "Polypropylene as a promising plastic: A review." Am. J. Polym. Sci 6.1 (2016): 1-11.
Cox, M. K. "Properties and applications of polyhydroxyalkanoates." Studies in Polymer Science. vol. 12. Elsevier, 1994. 120-135.
Berthet, M-A., et al. "Sustainable food packaging: Valorising wheat straw fibres for tuning PHBV-based composites properties." Composites Part A: Applied Science and Manufacturing 72 (2015): 139-147.
Khosravi-Darani, Kianoush, and D. Z. Bucci. "Application of poly (hydroxyalkanoate) in food packaging: Improvements by nanotechnology." Chemical and Biochemical Engineering Quarterly 29.2 (2015): 275-285.
Vidhate, S., Biodegradable poly (hydroxy butyrate-co-valerate) nanocomposites and blends with poly (butylene adipate co-terephthalate) for sensor applications. University of North Texas: 2011, 216 pages.
Zhu, Aiping, et al. "PMMA-grafted-silica/PVC nanocomposites: mechanical performance and barrier properties." Journal of applied polymer science 108.4 (2008): 2189-2196.
Wang, Shufang, et al. "Characteristics and biodegradation properties of poly (3-hydroxybutyrate-co-3-hydroxyvalerate)/organophilic montmorillonite (PHBV/OMMT) nanocomposite." Polymer Degradation and Stability 87.1 (2005): 69-76.
Li, Jing, M. F. Lai, and J. J. Liu. "Effect of poly (propylene carbonate) on the crystallization and melting behavior of poly (β-hydroxybutyrate-co-β-hydroxyvalerate)." Journal of applied polymer science 92.4 (2004): 2514-2521.
Qian, Jun, et al. "Comparison of different nucleating agents on crystallization of poly (3-hydroxybutyrate-co-3-hydroxyvalerates)." Journal of Polymer Science Part B: Polymer Physics 45.13 (2007): 1564-1577.
Yu, Hou-yong, Zong-yi Qin, and Z. H. O. U. Zhe. "Cellulose nanocrystals as green fillers to improve crystallization and hydrophilic property of poly (3-hydroxybutyrate-co-3-hydroxyvalerate)." Progress in Natural Science: Materials International 21.6 (2011): 478-484.
Choi, Jae Shin, and Won Ho Park. "Effect of biodegradable plasticizers on thermal and mechanical properties of poly (3-hydroxybutyrate)." Polymer testing 23.4 (2004): 455-460.
Hazer, Baki, and Alexander Steinbüchel. "Increased diversification of polyhydroxyalkanoates by modification reactions for industrial and medical applications." Applied Microbiology and Biotechnology 74.1 (2007): 1-12.
Ma, Piming, et al. "Toughening of PHBV/PBS and PHB/PBS blends via in situ compatibilization using dicumyl peroxide as a free-radical grafting initiator." Macromolecular Materials and Engineering 297.5 (2012): 402-410.
Maneewong, C. H. U. T. A. M. A. S., et al. "Improving Mechanical Properties of Poly-β-Hydroxybutyrate-co-β-Hydroxyvalerate by Blending with Natural Rubber and Epoxidized Natural Rubber." Advanced Materials and Engineering 983 (2014): 179-182.
Chutamas, Maneewong, Jackapon Sunthornvarabhas, and Klana Rong Sriroth. "Evaluation of gamma radiation on NR/PHBV blends." Applied Mechanics and Materials 300 (2013): 1325-1329.
Zhang, Kunyu, Amar K. Mohanty, and Manju Misra. "Fully biodegradable and biorenewable ternary blends from polylactide, poly (3-hydroxybutyrate-co-hydroxyvalerate) and poly (butylene succinate) with balanced properties." ACS applied materials & interfaces 4.6 (2012): 3091-3101.
Javadi, Alireza, et al. "Processing and characterization of microcellular PHBV/PBAT blends." Polymer engineering and science 50.7 (2010): 1440.
Bartczak, Z., et al. "Toughness mechanism in semi-crystalline polymer blends: II. High-density polyethylene toughened with calcium carbonate filler particles." Polymer 40.9 (1999): 2347-2365.
Panda, Bishnu P., Smita Mohanty, and Sanjay K. Nayak. "Mechanism of toughening in rubber toughened polyolefin—a review." Polymer-Plastics Technology and Engineering 54.5 (2015): 462-473.
Van der Wal, A., et al. "Polypropylene-rubber blends: 1. The effect of the matrix properties on the impact behaviour." Polymer 39.26 (1998): 6781-6787.
Muratoglu, O. K., et al. "Toughening mechanism of rubber-modified polyamides." Polymer 36.5 (1995): 921-930.
Inoue, Toshio. "Selective crosslinking in polymer blends. II. Its effect on impact strength and other mechanical properties of polypropylene/unsaturated elastomer blends." Journal of applied polymer science 54.6 (1994): 723-733.
Naskar, Kinsuk. "Thermoplastic elastomers based on PP/EPDM blends by dynamic vulcanization." Rubber chemistry and technology 80.3 (2007): 504-519.
Ishikawa, Masaru, Masataka Sugimoto, and Toshio Inoune. "Mechanism of toughening for polypropylene blended with ethylene-propylene-diene rubber following selective crosslinking." Journal of applied polymer science 62.10 (1996): 1495-1502.
Matsuda, Yushi, et al. "Effect of the compatibility on toughness of injection-molded polypropylene blended with EPR and SEBS." Polymer Engineering & Science 46.1 (2006): 29-38.
Jain, A. K., et al. "Effect of dynamic crosslinking on impact strength and other mechanical properties of polypropylene/ethylene-propylene-diene rubber blends." Journal of applied polymer science 78.12 (2000): 2089-2103.
Huang, Yun, et al. "Study on the effect of dicumyl peroxide on structure and properties of poly (lactic acid)/natural rubber blend." Journal of Polymers and the Environment 21 (2013): 375-387.
Kuntanoo, K., S. Promkotra, and P. Kaewkannetra. "Physical-biopolymer characterization of polyhydroxybutyrate-co-hydroxyvalerate (PHBV) blended with natural rubber latex." AIP Conference Proceedings. vol. 1653. No. 1. AIP Publishing, 2015. p. 020063.
Modi, Sunny J., et al. "Fabrication and improved performance of poly (3-hydroxybutyrate-co-3-hydroxyvalerate) for packaging by addition of high molecular weight natural rubber." Journal of Applied Polymer Science 133.37 (2016).
Chatterjee, T., et al. "Super thermoplastic vulcanizates based on carboxylated acrylonitrile butadiene rubber (XNBR) and polyamide (PA12)." European Polymer Journal 78 (2016): 235-252.
Luo, Shupin, Jinzhen Cao, and Armando G. McDonald. "Interfacial improvements in a green biopolymer alloy of poly (3-hydroxybutyrate-co-3-hydroxyvalerate) and lignin via in situ reactive extrusion." ACS Sustainable Chemistry & Engineering 4.6 (2016): 3465-3476.
Yuan, Daosheng, et al. "Crosslinked bicontinuous biobased polylactide/natural rubber materials: Super toughness,"net-like"-structure of NR phase and excellent interfacial adhesion." Polymer Testing 38 (2014): 73-80.
George, Snooppy, et al. "Rheological behaviour of thermoplastic elastomers from polypropylene/acrylonitrile-butadiene rubber blends: effect of blend ratio, reactive compatibilization and dynamic vulcanization." Polymer 40.15 (1999): 4325-4344.
Goharpey, F., A. A. Katbab, and H. Nazockdast. "Mechanism of morphology development in dynamically cured EPDM/PP TPEs. I. Effects of state of cure." Journal of applied polymer science 81.10 (2001): 2531-2544.

(56) References Cited

OTHER PUBLICATIONS

JeziÓrska, R. M. "Reactive extrusion of polymers." Advances in Polymer Processing. Woodhead Publishing, 2009. 143-172.
Larsson, Matilda, Olivia Markbo, and Patric Jannasch. "Melt processability and thermomechanical properties of blends based on polyhydroxyalkanoates and poly (butylene adipate-co-terephthalate)." RSC advances 6.50 (2016): 44354-44363.
He, Ji-Dong, et al. "Thermal analyses of poly (3-hydroxybutyrate), poly (3-hydroxybutyrate-co-3-hydroxyvalerate), and poly (3-hydroxybutyrate-co-3-hydroxyhexanoate)." Journal of applied polymer science 82.1 (2001): 90-98.
González-Ausejo, Jennifer, et al. "Compatibilization of poly (3-hydroxybutyrate-co-3-hydroxyvalerate)-poly (lactic acid) blends with diisocyanates." Journal of Applied Polymer Science 134.20 (2017).
Shogren, Randal. "Water vapor permeability of biodegradable polymers." Journal of environmental polymer degradation 5 (1997): 91-95.
Thiré, Rossana Mara da Silva Moreira, Liliane Cardoso Arruda, and Ledjane Silva Barreto. "Morphology and thermal properties of poly (3-hydroxybutyrate-co-3-hydroxyvalerate)/attapulgite nanocomposites." Materials Research 14 (2011): 340-344.
Sultana, N., and M. Wang. "PHBV/PLLA-based composite scaffolds containing nano-sized hydroxyapatite particles for bone tissue engineering." Journal of Experimental Nanoscience 3.2 (2008): 121-132.
Xu, Hongjun, et al. "Preparation and characterization of high-melt-strength polylactide with long-chain branched structure through γ-radiation-induced chemical reactions." Industrial & Engineering Chemistry Research 53.3 (2014): 1150-1159.
Lu, J., Yan, G., Zhang, G. et al. Synthesis and property investigation of poly(arylene ether)s with pendant cyclohexyl units. J Polym Res 24, 152 (2017). https://doi.org/10.1007/s10965-017-1317-1.
Wang, Kai, et al. "The effects of two-step reactive processing on the properties of recycled poly (ethylene terephthalate)." Polymer Bulletin 74 (2017): 2479-2496.
Shin, Boo Young, and Jae Hong Kim. "Rheological and mechanical properties of polyamide 6 modified by electron-beam initiated mediation process." Radiation Physics and Chemistry 112 (2015): 88-96.
Jim, Frankland. What About Melt Strength? 2013 https://www.ptonline.com/columns/what-about-melt-strength.
Peinado, Víctor, et al. "Effect of extrusion on the mechanical and rheological properties of a reinforced poly (lactic acid): Reprocessing and recycling of biobased materials." Materials 8.10 (2015): 7106-7117.
Sombatmankhong, Korakot, et al. "Bone scaffolds from electrospun fiber mats of poly (3-hydroxybutyrate), poly (3-hydroxybutyrate-co-3-hydroxyvalerate) and their blend." Polymer 48.5 (2007): 1419-1427.
Chun, Y. S., and W. N. Kim. "Thermal properties of poly (hydroxybutyrate-co-hydroxyvalerate) and poly (ϵ-caprolactone) blends." Polymer 41.6 (2000): 2305-2308.
Scandola, Mariastella, et al. "Polymer blends of natural poly (3-hydroxybutyrate-co-3-hydroxyvalerate) and a synthetic atactic poly (3-hydroxybutyrate). Characterization and biodegradation studies." Macromolecules 30.9 (1997): 2568-2574.
Han, Chan Chin, Jamil Ismail, and Hans-Werner Kammer. "Melt reaction in blends of poly (3-hydroxybutyrate-co-3-hydroxyvalerate) and epoxidized natural rubber." Polymer degradation and stability 85.3 (2004): 947-955.
Bianco, Alessandra, Manuela Calderone, and Ilaria Cacciotti. "Electrospun PHBV/PEO co-solution blends: Microstructure, thermal and mechanical properties." Materials Science and Engineering: C 33.3 (2013): 1067-1077.
Martínez-Abad, Antonio, et al. "Biodegradable poly (3-hydroxybutyrate-co-3-hydroxyvalerate)/thermoplastic polyurethane blends with improved mechanical and barrier performance." Polymer degradation and stability 132 (2016): 52-61.
Dorn, Maximilian. "Modification of molecular weight and flow properties of thermoplastics." Advances in Polymer Technology: Journal of the Polymer Processing Institute 5.2 (1985): 87-97.
Barrera, Cindy S., and Katrina Cornish. "Novel mineral and organic materials from agro-industrial residues as fillers for natural rubber." Journal of Polymers and the Environment 23.4 (2015): 437-448.
Kuntanoo, K., S. Promkotra, and P. Kaewkannetra. "Biodegradation of polyhydroxybutyrate-co-hydroxyvalerate (PHBV) blended with natural rubber in soil environment." Int. Sci. Index 7 (2013): 12.
McNally, Tony, et al. "Rheology, phase morphology, mechanical, impact and thermal properties of polypropylene/metallocene catalysed ethylene 1-octene copolymer blends." Polymer 43.13 (2002): 3785-3793.
Yin, Bo, et al. "Polycarbonate/liquid crystalline polymer blend: Crystallization of polycarbonate." Polymer 47.25 (2006): 8237-8240.
Buonerba, Antonio, et al. "Crystalline syndiotactic polystyrene as reinforcing agent of cis-1, 4-polybutadiene rubber." Macromolecules 43.1 (2010): 367-374.
Carli, Larissa N., et al. "The effects of silane coupling agents on the properties of PHBV/halloysite nanocomposites." Applied Clay Science 87 (2014): 311-319.
Modi, Sunny, Kurt Koelling, and Yael Vodovotz. "Assessing the mechanical, phase inversion, and rheological properties of poly-[(R)-3-hydroxybutyrate-co-(R)-3-hydroxyvalerate](PHBV) blended with poly-(1-lactic acid)(PLA)." European Polymer Journal 49.11 (2013): 3681-3690.
Modi, Sunny, Kurt Koelling, and Yael Vodovotz. "Miscibility of poly (3-hydroxybutyrate-co-3-hydroxyvalerate) with high molecular weight poly (lactic acid) blends determined by thermal analysis." Journal of applied polymer science 124.4 (2012): 3074-3081.
Dluzneski, Peter R. "Peroxide vulcanization of elastomers." Rubber chemistry and technology 74.3 (2001): 451-492.
Donnet, Jean-Baptiste, and Emmanuel Custodero. "Reinforcement of elastomers by particulate fillers." Science and technology of rubber. Academic Press, 2005. 367-400.
Ren, Xin. "Biodegradable plastics: a solution or a challenge?." Journal of cleaner Production 11.1 (2003): 27-40.
Zhang, Kunyu, Manjusri Misra, and Amar K. Mohanty. "Toughened sustainable green composites from poly (3-hydroxybutyrate-co-3-hydroxyvalerate) based ternary blends and miscanthus biofiber." ACS Sustainable Chemistry & Engineering 2.10 (2014): 2345-2354.
Harrison, Ian R., and J. Runt. "Incompatible blends: Thermal effects in a model system." Journal of Polymer Science: Polymer Physics Edition 18.11 (1980): 2257-2261.
Avella, M., E. Martuscelli, and M. Raimo. "Review Properties of blends and composites based on poly (3-hydroxy) butyrate (PHB) and poly (3-hydroxybutyrate-hydroxyvalerate)(PHBV) copolymers." Journal of materials science 35.3 (2000): 523-545.
Pongtanayut, K., C. Thongpin, and O. Santawitee. "The effect of rubber on morphology, thermal properties and mechanical properties of PLA/NR and PLA/ENR blends." Energy Procedia 34 (2013): 888-897.
Timpe Jr, D. C., Low Temperature Flexibility of Silicone Fusible Tapes. Arlon Technology Note. URL link: http://www. Arlon-std. com/index. cfm.
Ku, Harry, et al. "A review on the tensile properties of natural fiber reinforced polymer composites." Composites Part B: Engineering 42.4 (2011): 856-873.
Lipson, Jane EG, and Scott T. Milner. "Multiple glass transitions and local composition effects on polymer solvent mixtures." Journal of Polymer Science Part B: Polymer Physics 44.24 (2006): 3528-3545.
Fodor, Csaba, Attila Domján, and Béla Iván. "Unprecedented scissor effect of macromolecular cross-linkers on the glass transition temperature of poly (N-vinylimidazole), crystallinity suppression of poly (tetrahydrofuran) and molecular mobility by solid state NMR in poly (N-vinylimidazole)-1-poly (tetrahydrofuran) conetworks." Polymer Chemistry 4.13 (2013): 3714-3724.
Leite, Paulo RS, Bluma G. Soares, and Alex S. Sirqueira. "Dynamically vulcanized polypropylene/styrene-butadiene rubber blends:

(56) References Cited

OTHER PUBLICATIONS

The effect of a peroxide/bismaleimide curing system and composition." Journal of Applied Polymer Science 120.2 (2011): 981-990.
Liu, Guang-Chen, et al. "Fully biobased and supertough polylactide-based thermoplastic vulcanizates fabricated by peroxide-induced dynamic vulcanization and interfacial compatibilization." Biomacromolecules 15.11 (2014): 4260-4271.
Yu, Houyong, Chenfeng Yan, and Juming Yao. "Fully biodegradable food packaging materials based on functionalized cellulose nanocrystals/poly (3-hydroxybutyrate-co-3-hydroxyvalerate) nanocomposites." Rsc Advances 4.104 (2014): 59792-59802.
Liu, Guang-Chen, et al. "In situ formed crosslinked polyurethane toughened polylactide." Polymer Chemistry 5.7 (2014): 2530-2539.
Wang, Youhong, et al. "Supertoughened biobased poly (lactic acid)-epoxidized natural rubber thermoplastic vulcanizates: fabrication, co-continuous phase structure, interfacial in situ compatibilization, and toughening mechanism." The Journal of Physical Chemistry B 119.36 (2015): 12138-12146.
D'orazio, L., et al. "Effect of the addition of ethylene-propylene random copolymers on the properties of high-density polyethylene/isotactic polypropylene blends: Part 1—morphology and impact behavior of molded samples." Polymer Engineering & Science 22.9 (1982): 536-544.
Zhang, Kunyu, et al. "Supertoughened renewable PLA reactive multiphase blends system: phase morphology and performance." ACS applied materials & interfaces 6.15 (2014): 12436-12448.
Parulekar, Yashodhan, and Amar K. Mohanty. "Biodegradable toughened polymers from renewable resources: blends of polyhydroxybutyrate with epoxidized natural rubber and maleated polybutadiene." Green Chemistry 8.2 (2006): 206-213.
Takayanagi, M.; Uemura, S.; Minami, S. In Application of equivalent model method to dynamic rheo optical properties of crystalline polymer, Journal of Polymer Science: Polymer Symposia, Wiley Online Library: 1964; pp. 113-122.
Woo, Eamor M., et al. "Model with experimental evidences for the morphology of binary blends of a thermosetting polycyanate with thermoplastics." Macromolecules 27.19 (1994): 5291-5296.
Gibson, A. G., G. R. Davies, and I. M. Ward. "The interpretation of dynamic mechanical behavior in ultra high modulus polymers." Polymer Engineering & Science 20.14 (1980): 941-948.
Utara, S., and P. Boochathum. "Novel dynamic vulcanization of polyethylene and ozonolysed natural rubber blends: Effect of curing system and blending ratio." Journal of applied polymer science 120.5 (2011): 2606-2614.
Choudhary, V., H. S. Varma, and I. K. Varma. "Effect of EPDM rubber on melt rheology, morphology and mechanical properties of polypropylene/HDPE (9010) blend. 2." Polymer 32.14 (1991): 2541-2545.
Cunha, Mara, et al. "Film blowing of PHBV blends and PHBV-based multilayers for the production of biodegradable packages." Journal of Applied Polymer Science 133.2 (2016).
Zuiderduin, W. C. J., et al. "Toughening of polypropylene with calcium carbonate particles." Polymer 44.1 (2003): 261-275.
Gerard, Thibaut, and Tatiana Budtova. "Morphology and molten-state rheology of polylactide and polyhydroxyalkanoate blends." European polymer journal 48.6 (2012): 1110-1117.
Kaynak, Cevdet, Aslihan Arikan, and Teoman Tincer. "Flexibility improvement of short glass fiber reinforced epoxy by using a liquid elastomer." Polymer 44.8 (2003): 2433-2439.
Plotino, Gianluca, et al. "Flexural properties of endodontic posts and human root dentin." Dental materials 23.9 (2007): 1129-1135.
Joshi, Jayant, Richard Lehman, and Thomas Nosker. "Selected physical characteristics of polystyrene/high density polyethylene composites prepared from virgin and recycled materials." Journal of Applied Polymer Science 99.5 (2006): 2044-2051.
Xu, Hui, B. Seyhan Ince, and Peggy Cebe. "Development of the crystallinity and rigid amorphous fraction in cold-crystallized isotactic polystyrene." Journal of Polymer Science Part B: Polymer Physics 41.23 (2003): 3026-3036.
Silverajah, VS Giita, et al. "Mechanical, thermal and morphological properties of poly (lactic acid)/epoxidized palm olein blend." Molecules 17.10 (2012): 11729-11747.
Krache, Rachida, and Ismahane Debbah. "Some mechanical and thermal properties of PC/ABS blends." Materials Sciences and Applications 2.5 (2011): 404-410.
Hussain, M.; Ko, Y. H.; Choa, Y. H., Significant enhancement of mechanical and thermal properties of thermoplastic polyester elastomer by polymer blending and nanoinclusion. Journal of Nanomaterials 2016. ID 8515103.
Borggreve, R. J. M., et al. "Brittle-tough transition in nylon-rubber blends: effect of rubber concentration and particle size." Polymer 28.9 (1987): 1489-1496.
Bitinis, Natacha, et al. "Structure and properties of polylactide/natural rubber blends." Materials Chemistry and Physics 129.3 (2011): 823-831.
Wu, Souheng. "Impact fracture mechanisms in polymer blends: Rubber-toughened nylon." Journal of Polymer Science: Polymer Physics Edition 21.5 (1983): 699-716.
Thomason, J. L. "The influence of fibre length, diameter and concentration on the impact performance of long glass-fibre reinforced polyamide 6, 6." Composites Part A: Applied Science and Manufacturing 40.2 (2009): 114-124.
Liang, J. Z., and R. K. Y. Li. "Rubber toughening in polypropylene: A review." Journal of Applied Polymer Science 77.2 (2000): 409-417.

* cited by examiner

BIO-BASED POLYMER COMPOSITIONS AND METHODS OF MAKING AND USING THEREOF

CROSS-REFERENCE TO RELATED APPLICATIONS

This application is a national stage application filed under 35 U.S.C. § 371 of PCT/US2019/065265 filed Dec. 9, 2019, which claims benefit of U.S. Provisional Application No. 62/776,755, filed Dec. 7, 2018, which is fully incorporated by reference and made a part hereof.

BACKGROUND

The development of polymeric materials is amongst the most significant advances in materials science in the past century. Polyolefins are a widely utilized class of polymers. The versatility and cost-effectiveness of polyolefins has driven their rapid adoption, replacing metals and glass in many applications. However, the extensive use of these polymers raises environmental concerns due to their non-biodegradability. Moreover, most polyolefins are derived from petroleum, which is a non-renewable finite resource. Given the shortcomings of petroleum-based polymers, there is an interest in developing 'green' alternatives which are derived from renewable, biocompatible materials.

Polyhydroxyalkanoates (PHAs) are biodegradable and biocompatible thermoplastic polyesters with properties similar to classical polyolefins. PHAs have attracted attention as environmentally degradable resins, which are useful for a wide range of applications. However, PHAs are highly hydrophobic and degrade thermally during processing. By way of example, polyhydroxybutyrates (PHB) are members of the PHA family whose applications can be limited by brittleness, a narrow processing window, and thermal instability. Efforts have been made to overcome the shortcomings of PHAs both by plasticizing the polymer and by copolymerizing PHAs with suitable functional polymers/oligomers. However, further improvements are still needed before PHAs can replace traditional synthetic polymers, such as polyolefins, in many applications.

SUMMARY

Provided herein are polymeric compostions that comprise a blend comprising a polyhydroxyalkanoate (PHA) polymer, and a rubber polymer. The blend can comprise a biphasic mixture comprising a first phase comprising the PHA polymer, and a second phase comprising the rubber polymer dispersed with the first phase. The rubber polymer can be crosslinked, for example, through reaction with a free radical initiator. By incorporating the crosslinked rubber polymer, the polymer composition can exhibit one or more improved characteristics relative to PHA alone, including improved thermal stability, improved melt strength, improved flexibility, improved toughness, or a combination thereof.

The PHA polymer can be any suitable PHA polymer. For example, the PHA polymer can comprise a polymer or copolymer of one or more monomers selected from lactic acid, 3-hydroxypropionate, 3-hydroxybutyrate, 4-hydroxybutyrate, 4-hydroxyvalerate, 5-hydroxyvalerate, 3-hydroxyhexanoate, 6-hydroxyhexanoate, and 3-hydroxyoctanoate. In some embodiments, the polyhydroxyalkanoate polymer can comprise poly(3-hydroxybutyrate-co-3-hydroxypropionate), poly(3-hydroxybutyrate-co-4-hydroxybutyrate), poly(3-hydroxybutyrate-co-4-hydroxyvalerate), poly(3-hydroxybutyrate-co-3-hydroxyvalerate), poly(3-hydroxybutyrate-co-3-hydroxyhexanoate), poly(3-hydroxybutyrate-co-5-hydroxyvalerate), poly(3-hydroxybutyrate-co-6-hydroxyhexanoate), or combinations thereof. In certain embodiments, the polyhydroxyalkanoate polymer can comprise poly(3-hydroxybutyrate-co-3-hydroxyvalerate). In some cases, the poly(3-hydroxybutyrate-co-3-hydroxyvalerate) can comprise from 99 mol % to 85 mol % 3-hydroxybutyrate and 1 mol % to 15 mol % 3-hydroxyvalerate, such as from 99 mol % to 95 mol % 3-hydroxybutyrate and 1 mol % to 5 mol % 3-hydroxyvalerate, or from 95 mol % to 88 mol % 3-hydroxybutyrate and 5 mol % to 12 mol % 3-hydroxyvalerate. The PHA can be present in the blend in an amount of from 60% to 99% by weight (e.g., from 70% to 99% by weight, from 75% to 98% by weight, from 80% to 95% by weight, or from 85% to 90% by weight), based on the total weight of all polymers present in the blend.

The rubber polymer can comprise butyl rubber, nitrile rubber, a diene rubber, a diene block copolymer rubber, an olefin copolymer rubber, a copolymer thereof, or a blend thereof. In certain embodiments, the rubber polymer can comprise a diene rubber, such as natural rubber. The rubber polymer can be present in the blend in an amount of from 1% to 40% by weight (e.g., from 1% to 30% by weight, from 2% to 25% by weight, from 5% to 20% by weight, or from 10% to 15% by weight), based on the total weight of all polymers present in the blend.

Optionally, the composition can further comprises an additive, such as an antioxidant, pigment, compatibilizer, stabilizer, filler, plasticizer, surfactant, lubricant, nucleating agent, anti-slip agent, anti-blocking agent, radical scavenger, or any combination thereof.

In some embodiments, the blend can be formed by melting the polyhydroxyalkanoate polymer and the rubber polymer in the presence of a free radical initiator. In some-embodiments, the blend can be formed by reactively extruding a mixture comprising the polyhydroxyalkanoate polymer, the rubber polymer, and a free radical initiator.

The free radical initiator can comprise any suitable free radical initiator known in the art. In some embodiments, the free radical intiator can comprise a peroxide, such as dicumyl peroxide, t-amyl-2-ethylhexyl peroxycarbonate, 1,1-bis(t-butylperoxy)-3,3,5-trimethylcyclohexane, 2,5-dimethyl-2,5-di(t-butylperoxy) hexane, 2,5-dimethyl-2,5-di(t-amyl peroxy) hexane, 2,5-bis(t-butylperoxy)-2,5-dimethylhexane, 2,5-dimethyl-di(t-butylperoxy) hexyne-3, di-t-butyl peroxide, benzoyl peroxide, di-t-amyl peroxide, t-butyl cumyl peroxide, n-butyl-4,4-bis(t-butylperoxy) valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy) butane, ethyl-3,3-di(t-butylperoxy) butyrate, 2,2-di(t-amylperoxy) propane, ethyl-3,3-di (t-amylperoxy) butyrate, t-butylperoxy-acetate, t-amylperoxyacetate, t-butylperoxybenzoate, t-amylperoxybenzoate, di-t-butyldiperoxyphthalate, or a combination thereof. The free radical initiator can be present in an amount from 0.1 to 5 parts per hundred rubber, such as from 0.5 to 5 parts per hundred rubber or from 1 to 3 parts per hundred rubber.

In some embodiments, the blend can be a bio-based blend. In certain embodiments, the renewable carbon content of the blend can be at least about 15% by weight, at least 50% by weight, at least 95% by weight, least 97% by weight, at least 98% by weight, at least 99% by weight, or is 100% by weight, as measured according to the standard method described in ASTMD6866-18. In some embodiments, the composition can be compostable, as determined by ASTM D6400-19.

In some embodiments, the blend can exhibit at least two distinct glass transition temperatures.

In some embodiments, the blend exhibits a flexural modulus of less than 3250 MPa as measured according to the standard method described in ASTM D790-15, such as a flexural modulus of less than 3000 as measured according to the standard method described in ASTM D790-15. In certain embodiments, the blend can exhibit a flexural modulus of from 750 MPa to 3250 MPa as measured according to the standard method described in ASTM D790-15, such as a flexural modulus of from 1000 MPa to 3000 MPa as measured according to the standard method described in ASTM D790-15.

In some embodiments, the blend can exhibit a tensile strength of from 12 MPa to 33 MPa as measured according to the standard method described in ASTM D638-08.

In some embodiments, the blend can exhibit a notched impact strength of at least 28 J/m, such as a notched impact strength of from 28 J/m to 35 J/m as measured according to the standard methods described in ASTM D256-10.

In some embodiments, the PHA polymer can exhibit a melting temperature and the blend can exhibit a melting temperature, and the melting temperature of the blend can be at least 2° C. less (e.g., from 2° C. to 8° C. less) than the melting temperature of the PHA polymer.

In some embodiments, the PHA polymer can exhibit an onset crystallization temperature and the blend can exhibit an onset crystallization temperature, and the onset crystallization temperature of the blend can be at least 2° C. less (e.g., from 2° C. to 8° C. less) than the onset crystallization temperature of the PHA polymer.

In some embodiments, the blend can exhibit a degree of crystallinity of from 50% to 70%, as determined by differential scanning calorimetry (DSC).

Also provided are articles (e.g., packaging including, but not limited to, packaging and containers for food and beverage products, cosmetic products, detergents and cleaning products, personal care products, pharmaceutical and wellness products) that comprise the polymeric composition described herein.

Also provided are methods of forming polymer compositions. These methods can comprise melting a polyhydroxyalkanoate polymer and a rubber polymer in the presence of a free radical initiator to form a blend. In some embodiments, these methods can comprise reactively extruding a mixture comprising a polyhydroxyalkanoate polymer, a rubber polymer, and a free radical initiator to form a blend.

DETAILED DESCRIPTION

Definitions

Figure 1:
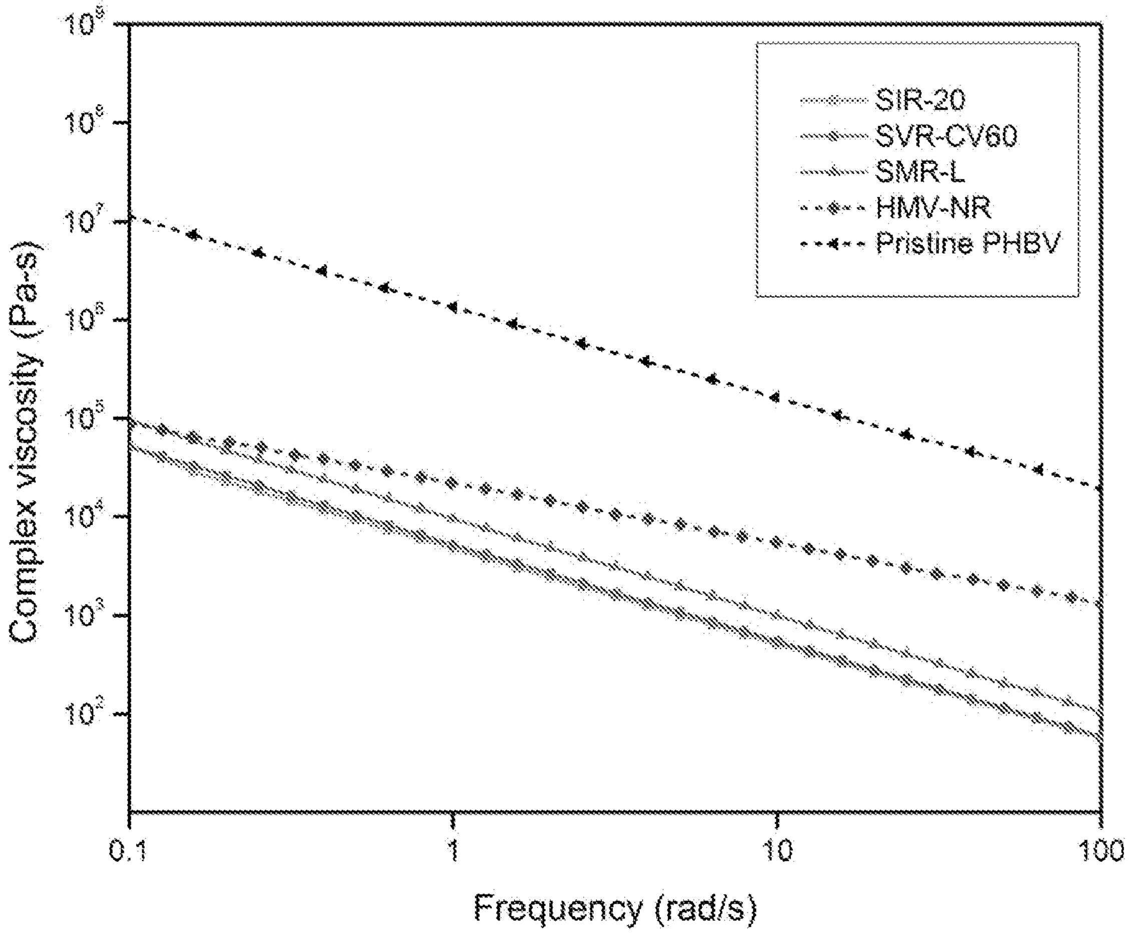
FIG. 1 is a plot comparing the complex viscosities of 1 phr organic peroxide 101SIL45 cured NRs (SIR-20, SVR-CV60, and SMR-L), HMW-NR, and PHBV (SIR-20: Standard Indonesian Rubber 20 grade, SVR-CV60: Standard Vietnamese Rubber CV60 grade, SMR-L: Standard Malaysian Rubber L grade, HMW-NR: high molecular weight natural rubber).

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

At various places in the present specification, divalent linking substituents are described. Where the structure clearly requires a linking group, the Markush variables listed for that group are understood to be linking groups.

Unless indicated otherwise, except within the claims, the use of "or" includes "and" and vice versa. Non-limiting terms are not to be construed as limiting unless expressly stated or the context clearly indicates otherwise (for example "including", "having," and "comprising" typically indicate "include without limitation"). "Consisting essentially of" shall mean that the blends, composites, articles and methods include the recited elements and exclude other elements of essential significance to the combination for the stated purpose. Thus, a blend, composite, article or method consisting essentially of the elements as defined herein would not exclude other materials or steps that do not materially affect the basic and novel characteristic(s) of the claimed invention. "Consisting of" shall mean that the blends, composites, articles and methods include the recited elements and exclude anything more than a trivial or inconsequential element or step. Embodiments defined by each of these transitional terms are within the scope of this disclosure. Singular forms included in the claims such as "a", "an," and "the" include the plural reference unless expressly stated otherwise. All relevant reference, including patents, patent applications, government publications, government regulations, and academic literature are hereinafter detailed and incorporated by reference in their entireties. The term "plurality," as used herein, is defined as two or more than two. The term "another," as used herein, is defined as: at least a second or more. The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "substantially" includes exactly the term it modifies and slight variations therefrom.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab and the variation inherent in the analytical method. Whether or not modified by about, the amounts include equivalents to those amounts. Any quantity stated herein and modified by "about" can also be employed as the amount not modified by about.

The prefix "bio-" is used herein to designate a material that has been derived from a renewable resource.

The term "renewable resource" refers to a resource that is produced by a natural process at a rate comparable to its rate of consumption (e.g., within a 100-year time frame). The resource can be replenished naturally, or via agricultural techniques.

The term "biobased content" refers to the percent by weight of a material that is composed of biological products or renewable agricultural materials or forestry materials or an intermediate feedstock.

The term "biodegradable" refers to a composite or product capable of being broken down (e.g. metabolized and/or hydrolyzed) by the action of naturally occurring microorganisms, such as fungi and bacteria.

The term "compostable" or "industrially compostable" refers to a composite or product that satisfies requirement, set by ASTM D6400-19 (ASTM D6400-19 (2019) entitled "Standard Specification for Labeling of Plastics Designed to be Aerobically Composted in Municipal or Industrial Facilities," which is hereby incorporated by reference in its entirety), for aerobic composting in municipal and industrial facilities. In a brief note, a compostable material fulfilling ASTM D6400-19 requirements is substantially broken down in compost at a rate that is consistent with known compostable materials (e.g., cellulose), disintegrates into small pieces, and leaves no toxic residue.

The term "melt strength" refers to the resistance of a polymeric melt to stretching, which influences drawdown and sag from the die to the rolls in polymer processing.

The term "MFI" refers to the melt flow index of a polymeric composition, which influences the flowability of the materials in polymer processing.

The term "free radical initiator" refers to a substance that can produce radical species under mild conditions and promote radical reactions. Non-limiting examples of "free radical initiators" include, for example dibenzoyl peroxide, benzoyl peroxide and dicumyl peroxide, including but not limited to: 2,5-dimethyl-2,5-di(t-butylperoxy) 3-hexyne; 2,5-dimethyl-2,5-di(t-butylperoxy) hexane; 2,5-dimethyl-2,5-di(t-amylperoxy) hexane; 4-(t-butylperoxy)-4-methyl-2-pentanol; bis(t-butylperoxyisopropyl)benzene; dicumyl peroxide; ethyl 3,3-bis(t-butylperoxy) butyrate; ethyl 3,3-bis(t-amylperoxy) butyrate; and dibenzoyl peroxide.

The term "weight percent" or "wt. %" refers to the weight percent of a component in the composite or blend with respect to the weight of the whole composite or blend.

The term "(co) polymer" includes both homopolymers and copolymers.

The term "about" modifying any amount refers to the variation in that amount encountered in real world conditions of producing materials such as polymers or composite materials, e.g., in the lab, pilot plant, production facility. Whether or not modified by about, the amounts include equivalents to those amounts. Any quantity stated herein and modified by "about" can also be employed in the present invention as the amount not modified by about.

Polymeric Compositions

Provided herein are polymeric compostions that comprise a blend comprising a polyhydroxyalkanoate (PHA) polymer, and a rubber polymer. The blend can comprise a biphasic mixture comprising a first phase comprising the PHA polymer, and a second phase comprising the rubber polymer dispersed with the first phase. The rubber polymer can be crosslinked, for example, through reaction with a free radical initiator. By incorporating the crosslinked rubber polymer, the polymer composition can exhibit one or more improved characteristics relative to PHA alone, including improved thermal stability, improved melt strength, improved flexibility, improved toughness, or a combination thereof.

The PHA polymer can be any suitable polyhydroxyalkanoate. Polyhydroxyalkanoates (PHAs) are biological polyesters synthesized by a broad range of natural and genetically engineered bacteria as well as genetically engineered plant crops. PHAs are biodegradable thermoplastic materials, produced from renewable resources, with the potential for use in a broad range of industrial applications. Useful microbial strains for producing PHAs, include *Alcaligenes eutrophus* (renamed as *Ralstonia eutropha*), *Alcaligenes latus, Azotobacter, Aeromonas, Comamonas, Pseudomonads*, and genetically engineered organisms including genetically engineered microbes such as *Pseudomonas, Ralstonia* and *Escherichia coli.*

In general, PHAs are formed by enzymatic polymerization of one or more monomer units inside a living cell. Over 100 different types of monomers have been incorporated into the PHA polymers (Steinbüchel and Valentin, 1995, *FEMS Microbiol. Lett.* 128:219-228. Examples of monomer units incorporated in PHAs include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center. In some embodiments, the PHA polymer does not include lactic acid monomer (e.g., the PHA polymer is not poly(lactic acid) or copolymer thereof).

In some embodiments, the PHA can be a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In some embodiments, the PHA can be a copolymer (containing two or more different monomer units) in which the different monomers are randomly distributed in the polymer chain. Examples of PHA copolymers include poly (3-hydroxybutyrate-co-3-hydroxypropionate) (hereinafter referred to as PHB3HP), poly(3-hydroxybutyrate-co-4-hydroxybutyrate) (hereinafter referred to as P3HB4HB), poly (3-hydroxybutyrate-co-4-hydroxyvalerate) (hereinafter referred to as PHB4HV), poly(3-hydroxybutyrate-co-3-hydroxyvalerate) (hereinafter referred to as PHB3HV or PHBV), poly(3-hydroxybutyrate-co-3-hydroxyhexanoate) (hereinafter referred to as PHB3HH) and poly(3-hydroxybutyrate-co-5-hydroxyvalerate) (hereinafter referred to as PHB5HV).

By selecting the monomer types and controlling the ratios of the monomer units in a given PHA copolymer, a wide range of material properties can be achieved. Although examples of PHA copolymers having two different monomer units have been provided, the PHA can have more than two different monomer units (e.g., three different monomer units, four different monomer units, five different monomer units, six different monomer units). An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers (e.g., at least 85% by weight of the total monomers, or greater than 90% by weight of the total monomers, for example 92%, 93%, 94%, 95%, 96% by weight of the copolymer and the HX comprises one or more monomers selected from 3HH, 3HO, 3HD, 3HDd.

The homopolymer (where all monomer units are identical) P3HB and 3-hydroxybutyrate copolymers (P3HB3HP, P3HB4HB, P3HB3HV, P3HB4HV, P3HB5HV, P3HB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature ($T_g$) in the range of 6° C. to −10° C., and a melting temperature ($T_m$) of from 80° C. to 180° C. Type 2 PHB copolymers typically have a $T_g$ of −20° C. to −50° C. and $T_m$ of 55° C. to 90° C. In particular embodiments, the Type 2 copolymer has a mostly amorphous phase with a $T_g$ of −15° C. to −45° C.

Type 1 PHB copolymers can have two monomer units with a majority of their monomer units being 3-hydroxybutyrate monomer by weight in the copolymer, for example, greater than 78% 3-hydroxybutyrate monomer. Example PHB copolymers can be biologically produced from renewable resources and include:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV; 13% 3HV; 14% 3HV; 15% 3HV.

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4%; 5%; 6% 3HH; 7%; 8% 3HH; 9% 3HH; 10% 3HH; 11% 3HH; 12% 3HH; 13% 3HH; 14% 3HH; 15% 3HH.

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers can have a 3HB content of between 80% and 5% by weight of the copolymer, for example 80%, 75%, 70%, 65%, 60%, 55%, 50%, 45%, 40%, 35%, 30%, 25%, 20%, 15%, 10%, 5% by weight of the copolymer.

PHB4HB is a Type 2 PHB copolymer where the 4HB content is in the range of 25% to 95% by weight of the copolymer and preferably in the range of 35 to 75% by weight of the copolymer for example: 25% 4HB; 30% 4HB; 35% 4HB; 40% 4HB; 45% 4HB; 50% 4HB; 60% 4HB; 70% 4HB; 80% 4HB; 90% 4HB and 95% 4HB by weight of the copolymer.

PHB5HV is a Type 2 PHB copolymer where the 5HV content is in the range of 25% to 95% by weight of the copolymer and preferably in the range of 35% to 75% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40%; 45%; 50%; 55%, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX 60% 3HX; 65% 3HX; 70% 3HX; 75% 3HX; 80% 3HX; 85% 3HX; 90% 3HX by weight of the copolymer.

PHAs can be selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer is a blend of PHB with PHB3HP where the PHB content in the PHA blend is in the range of 5% to 90% by weight of the PHA in the PHA blend and the 3HP content in the PHB3HP is in the range of 7% to 15% by weight of the PHB3HP.

The PHA blend of PHB with a Type 1 PHB copolymer is a blend of PHB with PHB3HV where the PHB content of the PHA blend is in the range of 5% to 90% by weight of the PHA in the PHA blend and the 3HV content in the PHB3HV is in the range of 4% to 22% by weight of the PHB3HV.

The PHA blend of PHB with a Type 1 PHB copolymer is a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer is a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer is a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer is a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer is a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer is a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer is a blend of PHB with PHB5HV where the PHB content in the PHA blend is in the range of 30% to 95% by weight of the PHA in the PHA blend and the 5HV content in the PHB5HV is in the range of 20% to 60% by weight of the PHB5HV.

The PHA blend of PHB with a Type 2 PHB copolymer is a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer is a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend is a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB: content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example, a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example, a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend can be a blend as disclosed in U.S. Published Application No. US 2004/0220355, by Whitehouse, published Nov. 4, 2004, which is incorporated herein by reference in its entirety.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254). Processes for producing the PHB copolymers PHB3HX have been described by Matsusaki et al. (*Biomacromolecules* 2000, 1:17-22). Genetically engineered microbial PHA production system with fast growing hosts such as *Escherichia coli* have been developed. In certain embodiments, genetic engineering also allows for the modification of wild-type microbes to improve the production of the 4HB comonomer. Examples of PHA production modification are described in Steinbuchel et. al., *FEMS Microbiol. Lett.,* 1995, 128, p 218. PCT Publication No. WO 98/04713 describes methods for controlling the molecular weight using genetic engineering to control the level of the PHA synthase enzyme. Commercially useful strains, including *Alcaligenes eutrophus* (renamed as *Ralstonia eutropha*), *Alcaligenes latus, Azotobacter vinlandii*, and *Pseudomonads* for producing PHA's are disclosed in Lee, *Biotechnology & Bioengineering,* 1994, 49: p 1 and Braunegg et. al., *J Biotechnology* 1998, 65, p 127. U.S. Pat. Nos. 6,316,262; 7,229,804; 6,759,219 and 6,689,589 describe biological systems for manufacture of PHA polymers containing 4-hydroxyacids are incorporated herein by reference. Also incorporated by reference is PCT Publication No. WO 2010/068953 which describes microbial production of poly-3-hydroxybutyrate-co-5-hydroxyvalerate copolymers.

In determining the molecular weight techniques such as gel permeation chromatography (GPC) can be used. In the methodology, a polystyrene standard is utilized. The PHA can have a polystyrene equivalent weight average molecular weight (in daltons) of at least 500, at least 10,000, or at least 50,000 and/or less than 2,000,000, less than 1,000,000, less than 1,500,000, and less than 800,000. In certain embodiments, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 50,000 to 1.5 million daltons.

In certain embodiments, the PHA can have a linear equivalent weight average molecular weight of from about 50,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs. elution volume' calibration method.

In some embodiments, the PHA polymer can comprise a polymer or copolymer of one or more monomers selected from lactic acid, 3-hydroxypropionate, 3-hydroxybutyrate, 4-hydroxybutyrate, 4-hydroxyvalerate, 5-hydroxyvalerate, 3-hydroxyhexanoate, 6-hydroxyhexanoate, and 3-hydroxyoctanoate. In some embodiments, the polyhydroxyalkanoate polymer can comprise poly(3-hydroxybutyrate-co-3-hydroxypropionate), poly(3-hydroxybutyrate-co-4-hydroxybutyrate), poly(3-hydroxybutyrate-co-4-hydroxyvalerate), poly(3-hydroxybutyrate-co-3-hydroxyvalerate), poly(3-hydroxybutyrate-co-3-hydroxyhexanoate), poly(3-hydroxybutyrate-co-5-hydroxyvalerate), poly(3-hydroxybutyrate-co-6-hydroxyhexanoate), or combinations thereof. In certain embodiments, the polyhydroxyalkanoate polymer can comprise poly(3-hydroxybutyrate-co-3-hydroxyvalerate). In some cases, the poly(3-hydroxybutyrate-co-3-hydroxyvalerate) can comprise from 99 mol % to 85 mol % 3-hydroxybutyrate and 1 mol % to 15 mol % 3-hydroxyvalerate, such as from 99 mol % to 95 mol % 3-hydroxybutyrate and 1 mol % to 5 mol % 3-hydroxyvalerate, or from 95 mol % to 88 mol % 3-hydroxybutyrate and 5 mol % to 12 mol % 3-hydroxyvalerate. The PHA can be present in the blend in an amount of from 60% to 99% by weight (e.g., from 70% to 99% by weight, from 75% to 98% by weight, from 80% to 95% by weight, or from 85% to 90% by weight), based on the total weight of all polymers present in the blend.

In the polymeric compositions described herein, the rubber polymer can include, for example, butyl rubber, nitrile rubber, a diene rubber (e.g., such as natural rubber, butadiene rubber, isoprene rubber, chloroprene rubber, neoprene rubber, and the like, and copolymers thereof), a diene block copolymer rubber (e.g., styrene-butadiene, styrene-isoprene, SBS, SEBS, SEEBS, SIS, ABS, and the like), an olefin copolymer rubber (e.g., block copolymers such as SES, SEPS, SEEPS, SEP, and the like; other copolymers such as EP rubber, EPDM, partially hydrogenated diene rubbers, and the like; or mixtures or copolymers thereof), and mixtures or copolymers thereof.

In some embodiments, the rubber polymer can comprise natural rubber. In some embodiments, the rubber polymer can consist essentially of natural rubber. Natural rubber, as known to those in the art, is a rubbery polymer suitably obtained from plants and comprises mainly cis-1,4-isoprene units. The term "natural rubber" can also include crepe rubber, i.e., natural rubber comprising sodium bisulfite, smoked sheets formed from natural rubber, masticated natural rubber, and vulcanized natural rubber.

As used herein, butyl rubber, isobutylene-isoprene rubber, and a copolymer of isobutylene and isoprene are synonymous. If desired, the butyl rubber may optionally comprise functional groups, e.g., such as hydroxy, epoxy or halogen, e.g., chlorine and bromine. Typically, such groups are present as pendant side groups attached to the main polymer chain and/or as end-groups. Suitable commercially available butyl rubber materials include, but are not limited to, the butyl rubbers Butyl 165, 268, 365, 1065 and 1077 (available from Exxon Chemical), Butyl 100, 101-3, 200, 301, 302 and 402 (Polysar), and BK 1675N (Kautschuk-Gesellschaft GmbH, Germany); the chlorinated butyl rubbers Chlorobutyl 1065, 1066, and 1068 (Exxon Chemical) and Chlorobutyl 1240 and 1255 (Polysar); and the brominated butyl rubbers Bromobutyl 2222, 2233, 2244 and 2255 (Exxon Chemical) and Bromobutyl 2030 and X2 (Polysar). Suitable commercially available butadiene rubber materials include, but are not limited to, the butadiene rubbers SHELL 1220 cis-1,4-polybutadiene (available from Shell Chemical) NEOCIS BR40® (Enichem Elastomers) and UBEPOL BR150® (Ube Industries, Ltd.).

Suitable commercially available SBS, SEBS, SEEBS, SIS and ABS type rubber materials include, but are not limited to, the KRATON®) D series from Shell Chemical, which includes KRATON® D2109, D5119 and D5298; VECTOR® from Dexco; and FINAPRENE® from Fina Oil and Chemical. Suitable commercially available SES, SEPS, SEEPS and SEP type rubber materials include, but are not limited to, the KRATON® G series from Shell Chemical, which includes KRATON® G2705, G7702, G7715 and G7720; SEPTON® from Kuraray; and C-FLEX® from Concept.

Optionally, the rubber polymer may be functionalized with polar moieties by performing, e.g., maleic anhydride or sulfonic grafting. Suitable commercially available copolymer rubber materials functionalized by grafting include, but are not limited to, the KRATON® series from the Shell Corporation, which includes KRATON® FG1901X and FG1921X. Furthermore, copolymer rubber materials may be functionalized with hydroxy substitution at the polymer chain ends. An example of a suitable commercial styrene-block elastomer functionalized by hydroxy termination is SEPTON® HG252 from the Mitsubishi Chemical Company.

In some embodiments, the rubber polymer can comprise butyl rubber, nitrile rubber, a diene rubber, a diene block copolymer rubber, an olefin copolymer rubber, a copolymer thereof, or a blend thereof. In certain embodiments, the rubber polymer can comprise a diene rubber, such as natural rubber. The rubber polymer can be present in the blend in an amount of from 1% to 40% by weight (e.g., from 1% to 30% by weight, from 2% to 25% by weight, from 5% to 20% by weight, or from 10% to 15% by weight), based on the total weight of all polymers present in the blend.

In some embodiments, the blend can be a bio-based blend. The percentage of “renewable” carbon can be qualitatively measured in polymer materials using 14° C. radio carbon dating according to the standard test method described in ASTM D6866-18 (ASTM D6866-18 (2018), entitled “Standard Test Methods for Determining the Biobased Content of Solid, Liquid, and Gaseous Samples Using Radiocarbon Analysis,” which is hereby incorporated by reference in its entirety. In some embodiments, the blends are fully biobased or have a high, say greater than 50% biobased carbon content (e.g., greater than 60%, 70%, 80% up to greater than 98% biobased content). In certain embodiments, the renewable carbon content of the blend can be at least about 15% by weight, at least 50% by weight, at least 95% by weight, least 97% by weight, at least 98% by weight, at least 99% by weight, or is 100% by weight, as measured according to the standard method described in ASTMD6866-18. In some embodiments, the composition can be compostable, as determined by ASTM D6400-19.

In some embodiments, the blend can exhibit at least two distinct glass transition temperatures.

Incorporation of the rubber polymer can improve the flexibility of the PHA polymer. In some embodiments, the blend exhibits a flexural modulus of less than 3250 MPa as measured according to the standard method described in ASTM D790-15, such as a flexural modulus of less than 3000 as measured according to the standard method described in ASTM D790-15. In certain embodiments, the blend can exhibit a flexural modulus of from 750 MPa to 3250 MPa as measured according to the standard method described in ASTM D790-15, such as a flexural modulus of from 1000 MPa to 3000 MPa as measured according to the standard method described in ASTM D790-15.

In some embodiments, the PHA polymer can exhibit a flexural modulus as measured according to the standard method described in ASTM D790-15 and the blend can exhibit a flexural modulus as measured according to the standard method described in ASTM D790-15; and the flexural modulus of the blend can be from 25% to 90% of the flexural modulus of the PHA polymer.

In some embodiments, the blend can exhibit a tensile strength of from 12 MPa to 33 MPa as measured according to the standard method described in ASTM D638-08. In some embodiments, the PHA polymer can exhibit a tensile strength as measured according to the standard method described in ASTM D638-08 and the blend can exhibit a tensile strength as measured according to the standard method described in ASTM D638-08; and the tensile strength of the blend can be from 25% to 90% of the tensile strength of the PHA polymer.

Incorporation of the rubber polymer can improve the toughness of the PHA polymer. In some embodiments, the blend can exhibit a notched impact strength of at least 28 J/m, such as a notched impact strength of from 28 J/m to 35 J/m as measured according to the standard methods described in ASTM D256-10. In some embodiments, the PHA polymer can exhibit a notched impact strength as measured according to the standard method described in ASTM D256-10 and the blend can exhibit a notched impact strength as measured according to the standard method described in ASTM D256-10; and the notched impact strength of the blend can be from 110% to 200% of the notched impact strength of the PHA polymer.

Incorporation of the rubber polymer can improve the processability of the PHA polymer. In some embodiments, the PHA polymer can exhibit a melting temperature and the blend can exhibit a melting temperature, and the melting temperature of the blend can be at least 2° C. less (e.g., from 2° C. to 8° C. less) than the melting temperature of the PHA polymer.

In some embodiments, the PHA polymer can exhibit an onset crystallization temperature and the blend can exhibit an onset crystallization temperature, and the onset crystallization temperature of the blend can be at least 2° C. less (e.g., from 2° C. to 8° C. less) than the onset crystallization temperature of the PHA polymer.

In some embodiments, the blend can exhibit a degree of crystallinity of from 50% to 70%, as determined by differential scanning calorimetry (DSC).

In some embodiments, the blend can be formed by melting the polyhydroxyalkanoate polymer and the rubber polymer in the presence of a free radical initiator. In some embodiments, the blend can be formed by reactively extruding a mixture comprising the polyhydroxyalkanoate polymer, the rubber polymer, and a free radical initiator.

The free radical initiator can comprise any suitable free radical initiator known in the art. Examples of free radical initiators include peroxides, azo-derivatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy) hexane, 2,5-dimethyl-2,5-di(t-amylperoxy) hexane, 2,5-bis(t-butylperoxy)-2,5-dimethylhexane (available from Akzo Nobel as TRIGANOX® 101), 2,5-dimethyl-di(t-butylperoxy) hexyne-3, di-t-butyl peroxide, dicumyl peroxide, benzoyl peroxide, di-t-amyl peroxide, t-amylperoxy-2-ethylhexylcarbonate (TAEC), t-butyl cumyl peroxide, n-butyl-4,4-bis (t-butylperoxy) valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy) cyclohexane, 1,1-di(t-amylperoxy)-cyclohexane, 2,2-di(t-butylperoxy) butane, ethyl-3,3-di(t-butylperoxy) butyrate, 2,2-di(t-amylperoxy) propane, ethyl-3,3-di(t-amylperoxy) butyrate, t-butylperoxy-acetate, t-amylperoxyacetate, t-butylperoxybenzoate, t-amylperoxybenzoate, di-t-butyldiperoxyphthalate, and the like. Combinations and mixtures of peroxides can also be used. Examples of free radical initiators include those mentioned herein, as well as those described in, e.g., *Polymer Handbook,* 3$^{rd}$ Ed., J. Brandrup & E. H. Immergut, John Wiley and Sons, 1989, Ch. 2. Irradiation (e.g., e-beam or gamma irradiation) can also be used to induce crosslinking. The free radical initiator can be present in an amount from 0.1 to 5 parts per hundred rubber, such as from 0.5 to 5 parts per hundred rubber or from 1 to 3 parts per hundred rubber.

Optionally, in some embodiments, the polymeric composition can further include one or more additives. Examples of these additives include, but are not limited to, antioxidants, pigments, compatibilizers, thermal and UV stabilizers, inorganic and organic fillers, plasticizers, surfactants, lubricants, nucleating agents, anti-slip agents, anti-blocking agents and radical scavengers. Additionally, polyfunctional co-agents such as divinyl benzene, triallyl cyanurate and the like may be added. Such co-agents can be added to one or more of these additives for easier incorporation into the polymer. For instance, the co-agent can be mixed with a plasticizer, e.g., a non-reactive plasticizer, e.g., a citric acid ester, and then compounded with the polymer under conditions to induce branching. Other co-agents useful in the polymeric compositions include, for example, hyper-branched or dendritic polyesters, such as dendrtic and hyper-branched acrylates those sold by Sartomer, e.g., BOLTRON™ H20.

In some embodiments, plasticizers can be used to change the glass transition temperature and modulus of the composition. Surfactants may also be used. Lubricants may also be used, e.g., in injection molding applications. Plasticizers, surfactants and lubricants may all therefore be included in the overall composition.

In some embodiments, the polymeric compositions can include one or more plasticizers. Examples of plasticizers include phthalic compounds (including, but not limited to, dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2-diol, propane 1,3-diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other. Addition of plasticizers can increase biodegradation of the composition.

In some embodiments, the polymeric compositions can include one or more surfactants. Surfactants are generally used to de-dust, lubricate, reduce surface tension, and/or densify. Examples of surfactants include, but are not limited to mineral oil, castor oil, and soybean oil. One mineral oil surfactant is DRAKEOL® 34, available from Penreco (Dickinson, Tex., USA). MAXSPERSE® W-6000 and W-3000 solid surfactants are available from Chemax Polymer Additives (Piedmont, S.C., USA). Non-ionic surfactants with HLB values ranging from about 2 to about 16 can be used, examples being TWEEN®-20, TWEEN®-65, SPAN®-40 and SPAN®-85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

In some embodiments, the polymeric compositions can include one or more lubricants. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants are warmed and melted before or during processing of the blend.

In film applications, anti-block masterbatch can also be included. A suitable example is a slip anti-block masterbatch mixture of erucamide (20% by weight) diatomaceous earth (15% by weight) nucleant masterbatch (3% by weight), pelleted into the blend (62% by weight). Others are known to those of ordinary skill in the field of polymer processing.

In some embodiments, the polymeric compositions can include one or more fillers. Fillers include particulate and/or fibrous materials added to polymeric compositions, for example, to improve the physical properties and/or to reduce the cost of the composition. They can be classified according to their source, function, composition, and/or morphology. No single classification scheme is entirely adequate because of the overlap and ambiguity of these categories. The chemical composition and its effect on composite physical properties typically provides a basis for classifying fillers into three broad categories: nonreinforcing or degrading, semi-reinforcing or extending, and reinforcing fillers. The use of fillers in many commercial polymers is for the enhancement in stiffness, strength, dimensional stability, toughness, heat distortion temperature, color, damping, impermeability, and cost reduction, although not all of these desirable features are found in any single filled polymer. Improvements in composite physical properties is directly related to particle size, whereby the smaller particulate fillers impart greater reinforcement. Particle-size distribution and particle shape also have significant effects on composite reinforcement. Filler structure ranges from precise geometrical forms, such as spheres, hexagonal plates, or short fibers, to irregular masses. A particle with a high aspect ratio has higher reinforcement than a more spherical one. Fillers having a broad particle-size distribution have better packing in the polymer matrix and provide lower viscosity than that provided by an equal volume of the filler with a narrow particle-size distribution. The properties of particulate-filled polymers are determined by the properties of the components, by the shape of the filler phase, by the morphology of the system, and by the polymer-filler interfacial interactions. In certain embodiments, the fillers are biodegradable biological materials.

Examples of suitable fillers include inorganic fillers, including mineral fillers (e.g., talc, calcium carbonate, and/or clays (including nano-clays)) as well as other inorganic fillers such as glass fibers, carbon fibers, and fly ash; and organic fillers, including natural fibers from perennial grasses (including but not limited to miscanthus fibers), lignin, cellulose (including cellulose fibers and/or microcrystal cellulose and agricultural residues (including but not limited agricultural straws); by-products (biomass fillers) from coffee, tea, grape pomace, rice (e.g., rice husk), and other agricultural products; and combinations thereof.

In some embodiments, the polymeric compositions can include one or more cross-linking agents. Cross-linking agents, also referred to as co-agents, include cross-linking agents comprising two or more reactive functional groups such as epoxides or double bonds. These cross-linking agents modify the properties of the blend. These properties include, but are not limited to, melt strength or toughness. One type of cross-linking agent is an "epoxy functional compound." As used herein, "epoxy functional compound" is meant to include compounds with two or more epoxide groups capable of increasing the melt strength of polyhydroxyalkanoate polymers by branching, e.g., end branching as described above.

Examples of epoxy functional compounds can include epoxy-functional, styrene-acrylic polymers (such as, but not limited to, e.g., JONCRYL® ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat ESBO (Hobum, Hamburg, Germany) and EDENOL® B 316 (Cognis, Dusseldorf, Germany)).

If desired, reactive acrylic and functional acrylics cross-linking agents can be used to increase the molecular weight of polymers in the blend. Example cross-linking agents are sold commercially. BASF, for instance, sells multiple compounds under the trade name JONCRYL®, which are described in U.S. Pat. No. 6,984,694 to Blasius et al., "Oligomeric chain extenders for processing, post-processing and recycling of condensation polymers, synthesis, compositions and applications," incorporated herein by reference in its entirety. One such compound is JONCRYL® ADR-4368CS, which is styrene glycidyl methacrylate and is discussed below. Another is MP-40 (Kaneka). And still another is the Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled.

E.I. du Pont de Nemours & Company sells multiple reactive compounds under the trade name ELVALOY®, which are ethylene copolymers, such as acrylate copolymers, elastomeric terpolymers, and other copolymers. One such compound is ELVALOY® PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers. These materials are based on oligomers with styrene and acrylate building blocks that have glycidyl groups incorporated as side chains. A high number of epoxy groups per oligomer chain are used, for example 5, greater than 10, or greater than 20. These polymeric materials generally have a molecular weight greater than 3000, specifically greater than 4000, and more specifically greater than 6000. These are commercially available from S.C. Johnson Polymer, LLC (now owned by BASF) under the trade name JONCRYL®, ADR 4368 material. Other types of polyfunctional polymer materials with multiple epoxy groups are acrylic and/or polyolefin copolymers and oligomers containing glycidyl groups incorporated as side chains. A further example of such a polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat ESBO. from Hobum, Hamburg, or EDENOL® B 316 from Cognis, Dusseldorf), but others may also be used.

Another type of cross-linking agent are agents with two or more double bonds. Cross-linking agents with two or more double bond cross-link PHAs by after reacting at the double bonds. Examples of these include: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate.

If desired, nucleating agents can be added to the polymeric compositions to aid in crystallization. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis (4-tert-butylphenyl)phosphate, and methylene bis-(2,4-tert-butylphenyl)phosphate; sorbitol derivatives such as bis(p-methylbenzylidene) sorbitol and bis(p-ethylbenzylidene) sorbitol; and thioglycolic anhydride, p-toluenesulfonic acid and its metal salts. The above nucleating agents may be used either alone or in combinations with each other.

In some cases, the nucleating agent can be dispersed in a liquid carrier, which can be a plasticizer, e.g., a citric compound or an adipic compound, e.g., acetylcitrate tributyrate (CITROFLEX® A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water. In other embodiments, the nucleating agent can be aluminum hydroxy diphosphate or a compound comprising a nitrogen-containing heteroaromatic core. The nitrogen-containing heteroaromatic core can comprise a substituted or unsubstituted pyridine, pyrimidine, pyrazine, pyridazine, triazine, or imidazole.

The nucleating agent can be a nucleating agent as described in U.S. Published Application No. US 2005/0209377, by Allen Padwa, which is herein incorporated by reference in its entirety.

Another nucleating agent for use in the compositions described herein are milled as described in International Publication No. WO 2009/129499, published in English on Oct. 22, 2009, and which designates the United States, which is herein incorporated by reference in its entirety. Briefly, the nucleating agent can be milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent can be milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agent can be milled by other methods, such as jet milling and the like. Additionally, other methods can be utilized to reduce the particle size.

Methods of Use

The polymeric compositions described can be processed using standard methods known in the art to produce a variety of useful articles. Suitable processing methods can include processing the polymeric compositions at a temperature above the crystalline melting point of the polymers in the polymeric composition but below the decomposition point of any of the ingredients of the polymeric composition. While in heat plasticized condition, the polymeric composition can be processed into a desired shape, and subsequently cooled to set the shape and induce crystallization. Such shapes can include, but are not limited to, a fiber, filament, film, sheet, rod, tube, bottle, or other shape. Such processing can be performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming.

Thermoforming is a process that uses films or sheets of thermoplastic. In thermoforming operations, the polymeric composition can first be processed into a film or sheet. The film or sheet can then be placed in an oven and heated. When soft enough to be formed, the film or sheet is then transferred to a mold and formed into a desired shape.

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and can be used to produce deep draw products such as bottles and similar products with deep interiors, also benefits from the increased elasticity and melt strength and reduced sag of the polymer compositions described herein.

Articles made from the compositions described herein can optionally be annealed, for example, according to any of the methods disclosed in International Publication No. WO 2010/008445, entitled "Branched PHA Compositions, Methods For Their Production, And Use In Applications," which is incorporated by reference herein in their entirety. As disclosed herein, "annealing" and "heat treatment" means a treatment where the polymer composition processed to a product in nonliquid form is subsequently (i.e., after the film is formed) heated for a period of time. Annealing can provide benefits including puncture toughness and tear resistance in films formed from the polymeric compositions described herein. In some embodiments, the flat film can be heated to about 80° C. to about 140° C. for about 5 seconds to about 90 minutes, such as to about 90° C. to about 130° C. for about 10 minutes to about 70 minutes, or to about 110° C. to about 125° C. for about 15 minutes to about 60 minutes.

The compositions described herein can be provided in any suitable form convenient for an intended application. For example, the composition can be provided in pellet (before or after reactive extrusion) for use in the subsequent production of films, coatings, moldings or other articles, or the films, coatings, moldings and other articles.

The polymeric compositions described herein can be used to create, without limitation, a wide variety of useful products, e.g., automotive, consumer durable, consumer disposable, construction, electrical, medical, and packaging products. For instance, the polymeric compositions can be used to make, without limitation, films (e.g., packaging films, agricultural film, mulch film, erosion control, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for food and beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, yoghurt pots, plant pots, noodle bowls, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

The invention will be described in greater detail by way of specific examples. The following examples are offered for illustrative purposes, and are not intended to limit the invention in any manner. Those of skill in the art will readily recognize a variety of non-critical parameters which can be changed or modified to yield essentially the same results.

Example 1: Bio-Based Blends from Poly(3-Hydroxybutyrate-Co-3-Hydroxyvalerate) and Natural Rubber for Packaging Applications Poly(3-hydroxybutyrate-co-3-hydroxyvalerate) (PHBV) is a promising bioplastic but has limited packaging applications due to its brittleness and poor processability. Incorporation of highly viscous high molecular weight natural rubber (HMW-NR, gel extracted from natural rubber (NR)) into PHBV can improve these properties. HMW-NR is not commercially available, impeding commercialization of the PHB V/rubber blends. Therefore, an organic peroxide was used to selectively crosslink NR to increase its viscosity during its melt blending with PHBV. The PHBV/NR blends were fabricated through a two-step extrusion process using a twin-screw extruder. The blends contained two phases with crosslinked rubber being dispersed in PHBV, and had clear rubber loading-dependent differences in performance. The thermal stability and melt strength of the blends were enhanced over pristine PHBV, indicating improved processability. The flexibility and toughness of the blends were improved by 59% and 20%, respectively, compared with pristine PHBV, and were comparable to commercial petroleum-based plastics.

Background

Packaging currently accounts for more than one third of plastic consumption. Almost 90% of the plastics used in the packaging industry are petroleum-based, unsustainable, non-degradable, and the majority of them can persist for decades or even centuries. The accumulation of plastic waste is of great environmental concern to consumers. Plastic production represents the largest consumption of crude oil after transportation fuels, with a global production exceeding 311 million tons per year, a more than 620% increase since 1975. The development of bio-based, biodegradable alternatives to conventional plastics, with equivalent properties, is now a priority of the packaging industry.

Poly(3-hydroxybuty-rate-co-3-hydroxyvalerate (PHBV) is a bio-based and biodegradable thermoplastic with potential applications in environment-friendly products such as packaging, biomedical, and automotive products. PHBV is a polyhydroxyalkanoate (PHA)-type aliphatic polyester made by microbial fermentation of sugar, lipids or other carbon-rich food derived by-products. It is nontoxic, biocompatible, and completely biodegradable in composting, backyard or landfill conditions. PHBV can be extruded, molded and spun on conventional plastic processing equipment. Its tensile strength is similar to polypropylene (PP) (22-34 MPa) and its water permeability is similar to polyvinyl chloride (PVC, 9-10 g/($m^2$×24 h)). PHBV films and latex emulsions can substitute for aluminum inner linings of cardboard packaging. However, PHBV utility is still limited by high brittleness, slow crystallization rate, high degree of crystallinity, narrow processing window, and high cost. These limitations must be overcome before PHBV can be widely adopted as a viable, large-scale, biodegradable packaging material.

PHBV brittleness is mainly attributed to its high degree of crystallinity, large spherulites, and slow crystallization rate. Several approaches have been attempted to improve the flexibility of PHBV: 1. incorporation of nucleating agents to increase the nucleation density and crystallization rate, and reduce spherulite size; 2. internal or external plasticization of PHBV with soybean oil, dibutyl phthalate, triethyl citrate, and etc. to improve its ductility, elongation at break, and impact strength; 3. Fast cooling during PHBV processing to reduce crystallinity and spherulite size, although this can be counterproductive because secondary crystallization at room temperature may form larger spherulites; 4. chemical modification such as grafting reactions and copolymerization through esterification and transesterification with poly(ethylene oxide) (PEO) and polyhydroxyoctanoate (PHO); and 5. blending with flexible polymers such as poly(butylene succinate) (PBS) and poly(butylene adipate-co-terephthalate) (PBAT). Among these methods, the fourth and fifth options appear more industrially and economically viable than the others.

Toughening of brittle polymers with rubber can provide a simple and economic route to outstanding properties. Rubber toughens the matrix in two ways: 1. it helps dissipate energy by going through cavitation and acting as stress concentrators to cause localized shear yielding of the thermoplastic matrix; 2. It influences the crystallization behavior of the plastic matrix, leading to decreased crystallite size and a layer of paralleled crystalline lamellae perpendicular to the rubber-matrix interface. The crystalline layers slip under deformation, lowering the local yield stress, and improving the toughness. Rubber toughening extent depends on particle size and dispersion, inter-particle distance (inter-particle matrix ligament), rubber matrix adhesion, temperature, deformation rate, and the molecular structures of the polymer. Theoretically, maximal toughness can be obtained with optimal rubber particle size, homogeneous particle dispersion, and ligament thickness lower than the critical value, and good rubber matrix adhesion.

Without wishing to be bound by theory, toughening by selective crosslinking of the rubber particles using peroxide in the plastic matrix is conferred by three mechanisms: 1. crosslinking increases rubber viscosity, prevents coalescence of the particles, and enables homogeneous dispersion of the rubber particles; 2. crosslinking improves the modulus and cohesive strength of the rubber phase, leading to improved craze strength and hence toughness; For a notched polymer sample, local plastic deformation arises from the notch tip under an outside stress. Fibrils crossing the tip form during the deformation process. The strength of the fibrils is referred as craze strength. If the applied stress at the notch tip is lower than the craze strength, the polymer will experience yielding, thus causing ductile fracture. 3. crosslinking improves interfacial adhesion between the rubber and plastic matrices by formation of graft copolymers. PP craze strength and toughness were improved when blended with selectively crosslinked ethylene-propylene-diene rubber (EPDM). Selective crosslinking of the unsaturated bonds by N,N'-m-phenylene-bis-maleimide (PM) in PP blends with the elastomers EPDM, styrene-butadiene-styrene triblock copolymer (SBS), and styrene-isoprene-styrene (SIS) rubbers, increased interfacial adhesion and grafting of the rubbers to the PP, and improved impact strength. The tensile toughness and impact strength of polylactide (PLA)/natural rubber blends were improved by the addition of dicumyl peroxide (DCP) crosslinker during melt blending. Natural rubber and rubber latex can be used to improve the flexibility and toughness of PHBV. However, the use of selectively crosslinked natural rubber to improve the toughness of PHBV remains unexplored.

Selective crosslinking of rubber during its melt blending with thermoplastic can be conducted through reactive extrusion. Generally, two types of reactions, i.e., dynamic crosslinking of rubber and grafting between rubber and thermoplastic, occur during the reactive extrusion process. Radical initiators, such as peroxides, decompose and produce free radicals when exposed to heat during reactive extrusion. The strong radicals abstract H atoms from methylene groups along the polymer chain and initiate the formation of C—C cross-links within and between the two phases. The reactive extrusion process results in fine morphologies of the blends and improved interfacial interaction between rubber and thermoplastic phases. In a non-compatible blend, the dispersed phase usually agglomerates into large domains when the blend is further thermally processed, resulting in delamination, rigidness, and inferior appearance of the final product. In a compatibilized blend, the improved interphase adhesion and/or lowered interfacial tension stabilizes the dispersed phase and prevents it from agglomerating. This reactive extrusion process can be adopted for a large variety of rubber/plastic blends, and the properties of the resulting blends can be tailored accordingly.

The melt processability of plastics is affected by several factors including molecular characteristics, thermal properties, such as $T_g$ and $T_m$, and thermal diffusivity, rheological properties, degree of crystallinity, addition of additives, and others. PHBV is thermally unstable and degrades at temperatures only slightly above its melting point of ~180° C., resulting in a short residence time in the thermal processing process. Thus, increasing the temperature difference between melting temperature ($T_m$) and peak thermal degradation temperature ($T_p$) is desired. Also, the high crystallinity of PHBV makes it stiff at temperatures up to its $T_m$ but very fluid above its $T_m$, resulting in a very narrow temperature window for processing. The processability of PHBV can be improved by: 1. broadening the processing window by including additives to lower the PHBV $T_m$ and/or increase the $T_p$; 2. decreasing the degree of crystallization ($X_c$) of PHBV by increasing the valerate content or incorporation of elastomers, nanofillers, or other thermoplastics which can decrease the nucleation density of PHBV; 3. improving the melt strength of PHBV by introducing long-chain branched structures or melt strength enhancers, such as acrylic copolymer and silicate nanoclays, 4. improving the thermal stability of PHBV by incorporating polymer which can efficiently dissipate the heat to minimize its thermal degradation during the manufacturing process. For example, PHBV blended with dynamically crosslinked PBS had increased viscosity and improved processability.

Early research focused on improving the toughness of PHBV with 5-12 mol % hydroxyvalerate (HV) content. Unfortunately, these copolymers are no longer commercially available because the manufacturer reduced the HV to 2 mol % to reduce production cost. However, high HV content decreases yield strength and barrier properties. As such, the new, low HV PHBV (≤2 mol % HV) is more suited to food packaging applications than the high HV forms.

Similar viscosities of NR and PHBV are needed in the melt blending process to generate acceptable homogeneity of the final product. Thus, the NR viscosity must be increased by crosslinking to match the viscosity of pristine PHBV. Sulfur vulcanization, the conventional method of crosslinking NR, was ineligible because 1. sulfur aromas are unacceptable in food applications, and 2. The vulcanization process is difficult to fully halt, leading to a high risk of rapidly increasing viscosity inside the blend extruder and causing potential equipment damage. Organic peroxide curing can be accurately controlled by regulating time and temperature. Also, organic peroxide is odorless, and some are Food and Drug Administration approved for food contact applications.

In this example, the effect of peroxide addition and rubber concentration on rubber toughening efficiency was investigated. The blends were developed through melt blending using a twin-screw extruder. The mixing state of peroxide-crosslinked PHBV/NR blends was studied using Takayanagi's viscoelastic models. The PHBV/rubber blends showed phase separation with crosslinked rubber particles being dispersed in the PHBV matrix. The interfacial adhesion between the immiscible rubber and PHBV was improved by the grafting and crosslinking effects caused by the peroxide addition. The blends showed improved thermal, rheological, and mechanical performance over pristine PHBV, which are needed for specific, thermoformed, packaging applications.

Experimental

Materials. Standard Malaysian Rubber-L (SMR-L), Standard Indonesian Rubber-20 (SIR-20), and Standard Vietnamese Rubber (SVR-CV60) of constant viscosity were purchased from CentroTrade LLC (Wadsworth, OH). Three different peroxides, Luperox 101SIL45 (2,5-Bis(tert-butylperoxy)-2,5-dimethylhexane dispersed in silica), Luperox 101XL45 (2,5-Bis(tert-butylperoxy)-2,5-dimethylhexane dispersed in calcium carbonate), Luperox DC40KE (Bis (1-methyl-1-phenylethyl) dispersed in clay), were the generous gift of Arkema, King of Prussia, USA. PHBV with approximately 2 mol % hydroxyvalerate (HV) content was purchased from Tianan Biological Material Co. (Ningbo, China). Both rubber and peroxide were used as received. The PHBV pellets were vacuum dried for 24 hours at 60° C. before use.

Peroxide and Rubber Selection. Half-life refers to the time required for 50% of the peroxide to decompose into free radicals at a specific temperature. A temperature was chosen to maximize curing rate while minimizing potential adverse heat effects. The half-life of the peroxides at 180° C. was calculated as 1.55 mins, and six half-lives were sufficient for complete consumption of the peroxide. A curing time study was performed in 1.0-kg batches produced as follows. Each 1.0-kg sample was mixed in a Farrel BR lab mixer (Farrel, Cleveland, OH) for 45 seconds. The mixing temperature began at 30° C. and leveled off between 58 and 61° C. The samples were next milled with peroxide for 4 min on an EEMCO two-roll lab mill (Erie Mill and Press Co., Inc., Erie, PA). Samples were cured into sheets in a mold as described in ASTM D3182-16 (ASTM D3182-16 (2016) entitled "Standard Practice for Rubber—Materials, Equipment, and Procedures for Mixing Standard Compounds and Preparing Standard Vulcanized Sheets," which is hereby incorporated by reference in its entirety) with a thickness of 2 mm at 180° C. and 16 tons of force, using a Wabash 4-post, 30 ton heated press (Wabash MPI, Wabash, IN). Three types of organic peroxide, Luperox 101SIL45, Luperox DC40KE and Luperox 101XL45, were loaded at 0.5, 1.5 and 2 parts per hundred rubber (phr) in three grades of NR (SIR-20, SVR-CV60, SMR-L). After curing for 3-15 min, the materials were conditioned at room temperature for 24 h. Mechanical testing was conducted according to ASTM D412-16 (ASTM D412-16 (2016) entitled "Standard Test Methods for Vulcanized Rubber and Thermoplastic Elastomers-Tension," which is hereby incorporated by reference in its entirety) to determine the cure time needed to take the cross-linking reactions of the different formulations to completion. Based on these trials, Luperox 101XL45 was selected to selectively crosslink SMR-L during the melting blending with PHBV (see Results).

Blends Preparation. A two-step melt blending method was used to blend PHBV and natural rubber. First, the pre-dried PHBV granules were blended with natural rubber using a twin-screw extruder under a reverse compounding temperature from 180 to 145° C. Then 2 phr (based on the weight of the rubber incorporated) of peroxide Luperox 101XL45 was added to the blend under the same processing conditions employed in the first step. The weight ratios of the PHBV to natural rubber were as follows: 98/2, 95/5, 90/10, 85/15, 80/20, 75/25, the corresponding samples were denoted as 2%, 5%, 10%, 15%, 20%, and 25%, respectively. The blends were pelletized and used for subsequent thermal, rheological, spectroscopic, and mechanical characterizations.

Gel Fraction Measurement. The gel from the PHBV and natural rubber blends was obtained by extraction in chloroform at 60° C. for 48 hours. The gel fractions (Gf) were calculated by the following equation:

$$G_f = \frac{m_0}{m_1} \times 100\%$$

where $m_0$ is the initial weight of the samples, and $m_1$ is the weight of the dried residues obtained after extraction.

Scanning Electron Microscope (SEM). The surfaces of the blends and neat PHBV were visualized using a Quanta 200 (FEI Inc. Hillsboro, OR) scanning electron microscope (SEM). Pellet samples (0.5×0.5 $cm^2$) were coated with a 10 nm layer of gold using a Cressington 108 sputter coater (Cressington Scientific Instruments Ltd. Watford, UK). Differential Scanning calorimetry (DSC). Thermal transitions of the materials were investigated using known procedures using a TA Instrument Discovery DSC 2500 (New Castle, DE). Briefly, samples were vacuum dried at 60° C. for 24 h prior to testing. The samples were first heated from room temperature to 200° C. at a rate of 10° C. min-1. The samples were annealed at 200° C. for 4 min to remove the thermal history of the polymers, and subsequently cooled to −85° C., held for 4 min, and reheated from −85 to 200° C. with a heating rate of 10° min-1. The onset and peak crystallization temperatures ($T_{c(onset)}$ and $T_{c(peak)}$) were determined from the cooling scans. The glass transition temperature ($T_g$), melting temperature ($T_m$), enthalpy of fusion ($\Delta H_m$), and degree of crystallinity ($X_c$) were determined from the second heating scans. $T_m$ was determined at the peak value of the endotherms and the $T_g$ at the mid-point of the heat capacity changes (0-20 J g-1). The $\Delta H_m$ was determined from the area under the endotherms using TRIOS Software v4.1.1.33073. The relative crystallinity of the blends was obtained by dividing $\Delta H_m$ by the enthalpy value for a theoretically 100% crystalline PHBV (146 J g-1) taken from literature values.

Dynamic Mechanical Analysis (DMA). The viscoelastic properties of the blends were studied using a TA Instrument Q800 (New Castle, DE) using previously described methods. Briefly, the samples were equilibrated at −110° C. and subsequently heated to 150° C. at 5° C. min-1 and frequency of 1 Hz, using dual cantilever clamps. The sample dimensions were approximately 35 mm×12.5 mm×3 mm.

Rheological Characterization. Rheological behaviors of various cured rubber samples were analyzed using a TA Instrument Ares LSII rheometer (New Castle, DE) using previously described methods. Briefly, rheological characterizations were performed at 180° C. using a 25 mm parallel plate system. Each sample was equilibrated for 3 min before the gap was set to the testing position (approximately 1.8 mm) or until the top plate made contact with the upper surface of the sample. Complex viscosity (Pa-s) was measured within the frequency range of 0.1-100 rad sec-1. For each frequency sweep, the linear viscoelastic limits were determined by strain sweeps, before testing each batch.

The rheological behaviors of the PHBV and natural rubber blends also were investigated using previously reported methods with minor adjustment. Samples were vacuum dried at 60° C. for 24 h prior to testing. Rheological determinations were performed at 175° C. using a 25 mm parallel plate system. Each sample was equilibrated for 5 min before the gap was set to the testing position of approximately 0.9 mm or until the top plate made contact with the upper surface of the sample. The furnace was opened to remove excess material. Complex viscosity, storage modulus (G') and loss modulus (G") were measured with increasing frequency from 0.1 to 500 rad sec-1.45, 82-83 For each sample, percent strain for the frequency sweep was determined from the linear viscoelastic regime of the strain sweep. For each frequency sweep, the linear viscoelastic limits were determined prior to analysis, and the rheological analyses were performed in triplicate. The time sweeps were conducted at 1 rad $sec^{-1}$ under 175° C.

Mechanical Characterization. Mechanical properties were tested using previously described procedures with minor adjustments. Pellets of the blends from PHBV and natural rubber were injection molded into mechanical testing specimens and vacuum-dried for 24 h at 60° C. prior to testing. The tensile testing was conducted according to ASTM D638-08 (ASTM D638-08 (2008) entitled "Standard Test Method for Tensile Properties of Plastics," which is hereby incorporated by reference in its entirety) using an Instron 5542 with Bluehill v. 2.17 software package (Instron Corp., Norwood, MA). Dumbbell-shaped samples (165.0×19.0×7.0 $mm^3$) with a grip distance of 115 mm were prepared, and a crosshead speed of 5 mm/min at room temperature was used. The reported values are averages of at least five samples. Flexural properties were determined according to ASTM D790-15 (ASTM D790-15 (2015) entitled "Standard Test Methods for Flexural Properties of Unreinforced and Reinforced Plastics and Electrical Insulating Materials," which is hereby incorporated by reference in its entirety). Test sample dimension was 127.0×12.7×3.2 $mm^3$. Notched impact tests were conducted according to ASTM D256-10 (ASTM D256-10 (2010) entitled "Standard Test Methods for Determining the Izod Pendulum Impact Resistance of Plastics," which is hereby incorporated by reference in its entirety). Notched impact samples (63.5×12.7×0.32 $mm^3$ with a 22.5° notch) were tested using an impact tester from Tinius Olsen (Tinius Olsen Testing Machine Co., Horsham, PA). The reported standard deviation (SD) values were calculated from at least three samples. Statistical analysis was performed using JMP 10.0 (Marlow, Buckinghamshire). Significant differences (P-values <0.05) in mechanical data amongst PHBV and its blends were determined using one-way analysis of variance (ANOVA) and the Tukey HSD method.

Results and Discussion

Natural Rubber and Organic Peroxide Selection. The grade of natural rubber was chosen for the PHBV/rubber blends by comparing the viscosities of the peroxide 101SIL45 cured NRs (SIR-20, SVR-CV60, and SMR-L) with PHBV (FIG. 1). As mentioned above, close viscosities of the two components are preferred in the melt blending process to achieve reliable manufacturing and good homogeneity of the final products. Peroxide 101SIL45-cured SMR-L rubber had a complex viscosity closer to that of PHBV and HMW-NR over the frequency range tested than the other peroxide-rubber combinations (FIG. 1), so SMR-L was used to test peroxide type and loading.

Figure 2:
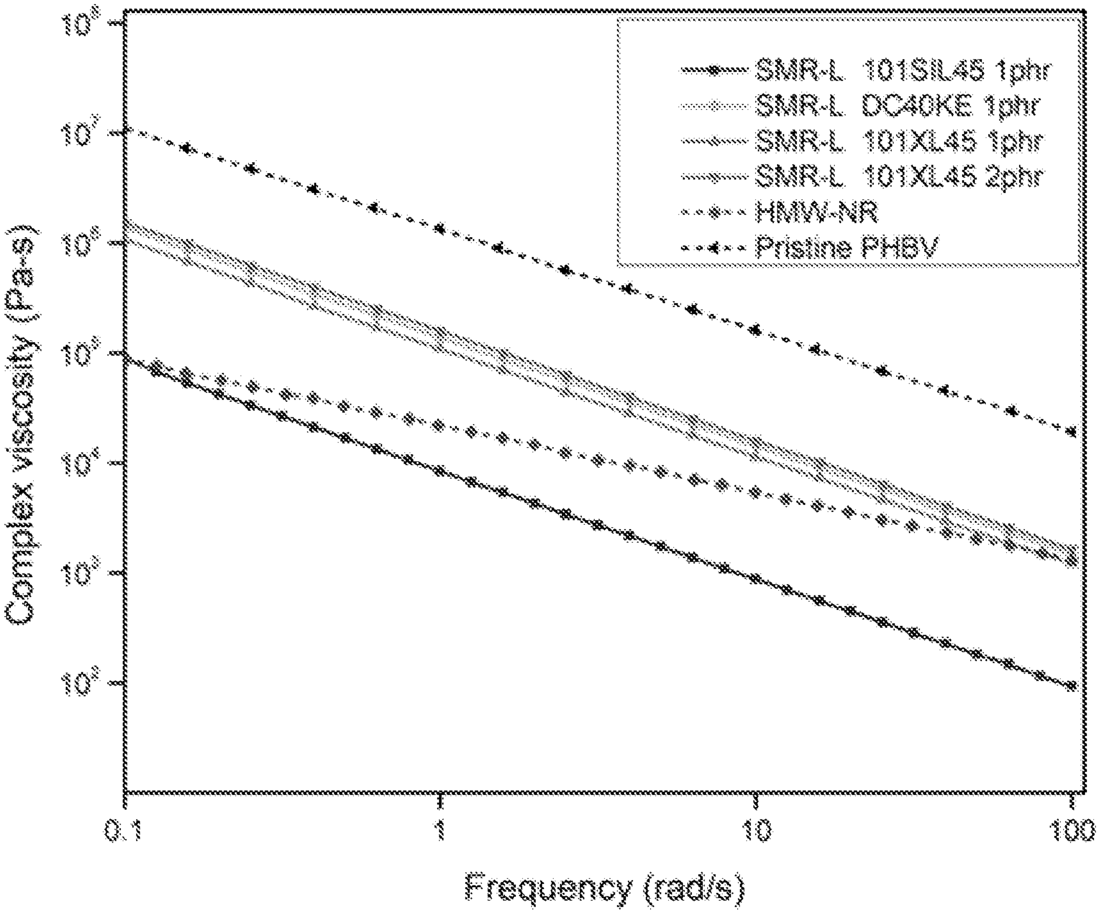
FIG. 2 is a plot comparing the complex viscosities of SMR-L (cured by three different types of organic peroxide: 101SIL45 and DC40KE at 1 phr, 101XL45 at 1 and 2 phr), HMW-NR, and PHBV (SMR-L: Standard Malaysian Rubber L grade, HMW-NR: high molecular weight natural rubber).

Peroxide 101XL45 and DC40KE cured SMR-L rubber had similar complex viscosities higher than that of the HMW-NR (FIG. 2). It is interesting that although peroxides 101XL45 and 101SIL45 had the same active component (2,5-Bis(tert-butylperoxy)-2,5-dimethylhexane), they showed different performance in crosslinking NR, with the former being more efficient in increasing NR viscosity. This may be because they were dispersed in different fillers: 101XL45 was dispersed in calcium carbonate while 101SIL45 was dispersed in silica. It has been reported acidic fillers have a deleterious effect on the peroxide efficiency because the peroxide can be consumed without formation of radicals in the presence of an acid component (untreated silica is acidic). Peroxide DC40KE had slightly better crosslinking efficiency than 101XL45. According to FDA regulations, peroxide DC40KE is described as a component of adhesives and coatings for food packaging (21 C.F.R. § 175.105, 21 C.F.R. § 175.300), and of polymer or rubber packaging "articles intended for repeated use" as described in articles 21 C.F.R. § 177.2420 and 21 C.F.R. § 177.2600. In contrast, peroxide 101XL45 can be "used as a basic component of single and repeated use food contact surfaces" as described in articles 21 C.F.R. § 177.1520 and 21 C.F.R. § 177.2600. As there is an urgent need for bioplastics that can be used in single-use disposable packaging, such as food service containers, peroxide 101XL45 was chosen for selective crosslinking of SMR-L during the melt blending with PHBV. The peroxide 101XL45 was added at 2 phr considering the rubber viscosity increased with peroxide loading and excessive peroxide (more than 2 phr) may cause intensive polymer degradation. The blends of PHBV and NR are denoted as PHBV/NR blends in this study.

Figure 3A:
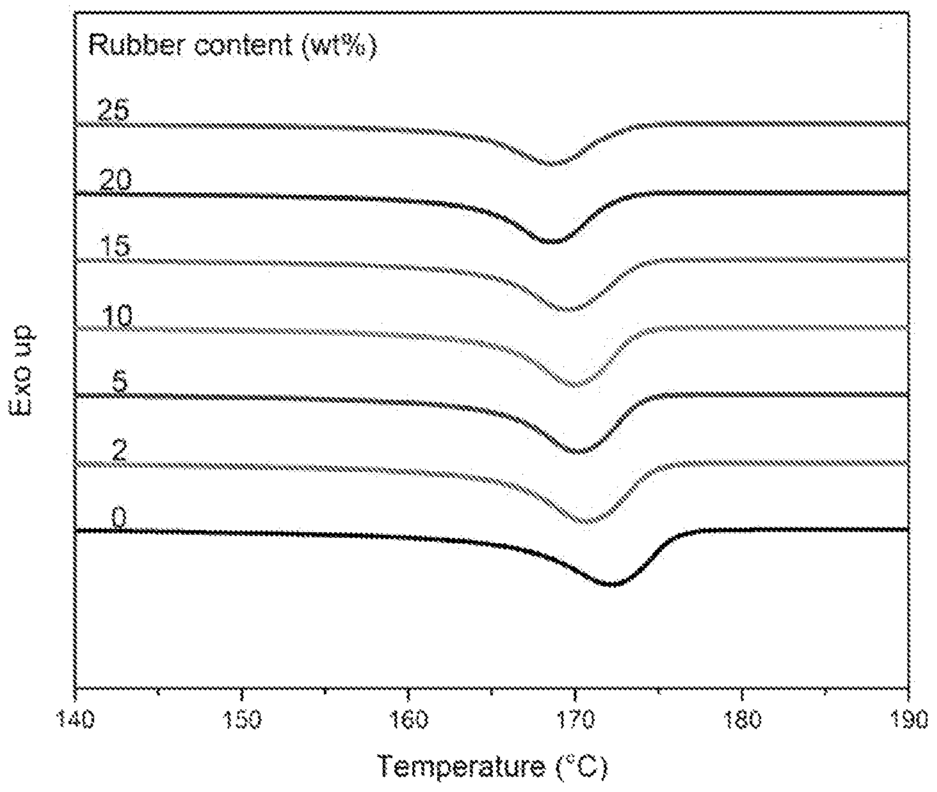
FIGS. 3A-3B are plots showing the melting transitions (FIG. 3A) and crystallizations (FIG. 3B) of PHBV/NR blends (cured by 2 phr organic peroxide 101XL45) determined from second heating and first cooling of DSC at 10° C. min-1, respectively.
Figure 3B:
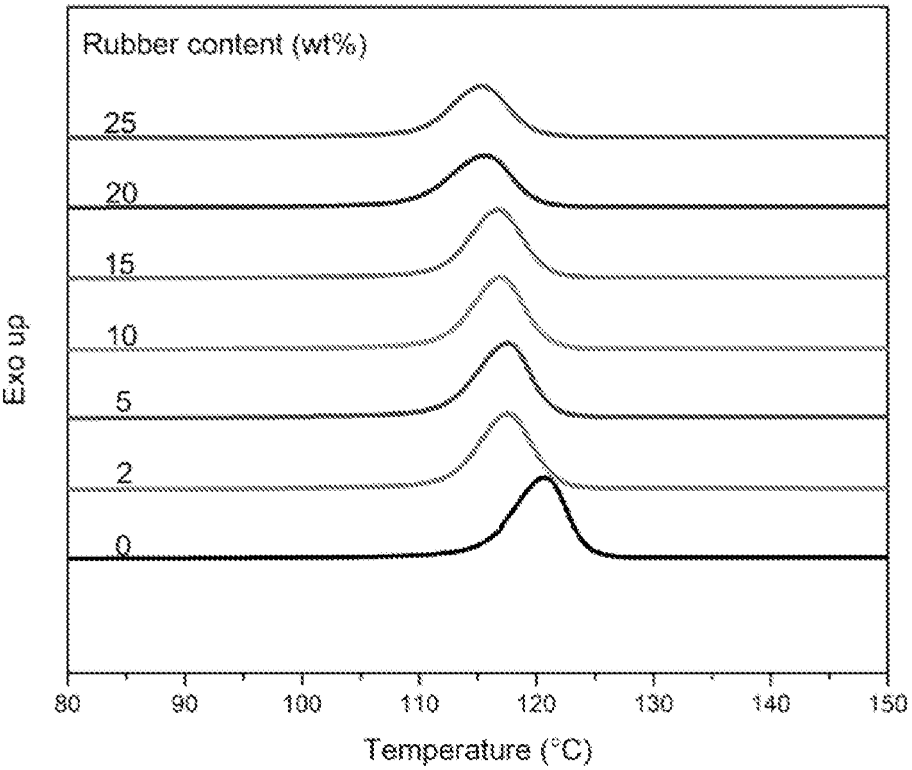

Thermal and Crystallization Behaviors. The melting and crystallization characteristics of PHBV significantly affect mechanical performance, heat resistance and barrier properties. The thermal and crystallization properties of PHBV and its blends were investigated using DSC. PHBV and its blends had a single melting temperature ranging from 168 to 172° C. in the second DSC heating scan (FIG. 3A, Table 1). Rubber appears to restrain PHBV crystallization from its preferred crystalline morphology, which results in the decreasing melting temperature of the PHBV blends with increasing rubber loading (Table 1). This is also reflected in the decreased peak and onset crystallization temperatures (FIG. 3B, Table 1) which suggests that the blends absorbed more potential energy to crystallize than the pristine PHBV, indicating that the addition of rubber made it more difficult for the PHBV in the blends to crystallize. Due to the lowered melting temperature, lower processing temperatures are then possible which, in turn, reduce thermal degradation of PHBV. The melting points of the PHBV/NR blends are much lower than those of most commonly used food packaging materials such as polyethylene terephthalate (PET) and polystyrene (PS), saving on processing costs.

TABLE 1

Melting and crystallizations of PHBV/NR blends (cured by 2 phr organic peroxide 101XL45) and pristine PHBV determined from second heating and first cooling of DSC at 10° C. $min^{-1}$, respectively.

| PHBV:NR (wt:wt) | $T_m$ (° C.) | $T_{c(onset)}$ (° C.) | $T_{c(peak)}$ (° C.) |
|---|---|---|---|
| 100/0 | 172.0 ± 0.14$^a$ | 124.4 ± 0.12$^a$ | 120.8 ± 0.18$^a$ |
| 98/2 | 170.7 ± 0.26$^{a,b}$ | 121.3 ± 0.33$^b$ | 117.8 ± 0.47$^b$ |

TABLE 1-continued

Melting and crystallizations of PHBV/NR blends (cured by 2 phr organic peroxide 101XL45) and pristine PHBV determined from second heating and first cooling of DSC at 10° C. $min^{-1}$, respectively.

| PHBV:NR (wt:wt) | $T_m$ (° C.) | $T_{c(onset)}$ (° C.) | $T_{c(peak)}$ (° C.) |
|---|---|---|---|
| 95/5 | 170.6 ± $0.46^{a,b}$ | 121.3 ± $0.06^{b}$ | 117.4 ± $0.16^{b}$ |
| 90/10 | 169.8 ± $0.76^{b,c}$ | 121.3 ± $0.19^{b}$ | 117.7 ± $0.23^{b}$ |
| 85/15 | 169.7 ± $0.17^{b,c}$ | 120.8 ± $0.08^{b,c}$ | 116.9 ± $0.09^{b,c}$ |
| 80/20 | 169.4 ± $1.14^{b,c}$ | 120.2 ± $0.28^{c,d}$ | 116.0 ± $0.55^{c,d}$ |
| 75/25 | 168.8 ± $0.39^{c}$ | 119.9 ± $0.18^{d}$ | 115.5 ± $0.28^{d}$ |

| PHBV:NR (wt:wt) | $T_{c(onset)} - T_{c(peak)}$ (° C.) | $X_c$ (%) |
|---|---|---|
| 100/0 | 3.6 ± $0.06^{c}$ | 74.7 ± $0.74^{a}$ |
| 98/2 | 3.5 ± $0.14^{c}$ | 70.3 ± $1.33^{a,b}$ |
| 95/5 | 3.8 ± $0.10^{b,c}$ | 70.1 ± $1.37^{a,b}$ |
| 90/10 | 3.6 ± $0.04^{c}$ | 67.3 ± $1.01^{b,c}$ |
| 85/15 | 3.9 ± $0.01^{a,b,c}$ | 63.5 ± $2.00^{c,d}$ |
| 80/20 | 4.2 ± $0.28^{a,b}$ | 60.5 ± $1.14^{d,e}$ |
| 75/25 | 4.4 ± $0.10^{a}$ | 57.2 ± $0.74^{e}$ |

*The column headings are:
$T_m$, melting temperature;
$T_{c(onset)}$, onset crystallization temperature,
$T_{c(peak)}$, peak crystallization temperature, and
$X_c$, crystallinity.

Figure 4:
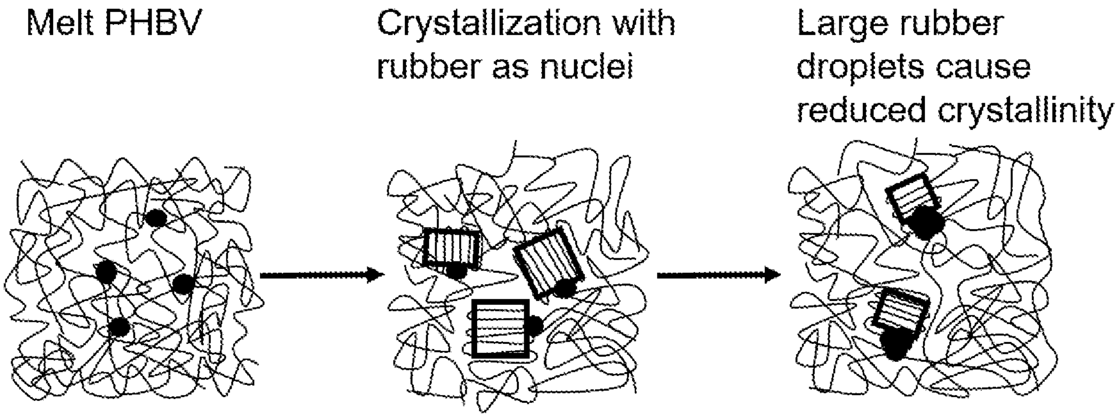
FIG. 4 is a schematic illustration of crystallization of PHBV with natural rubber as the nucleating agent.
Figure 12:
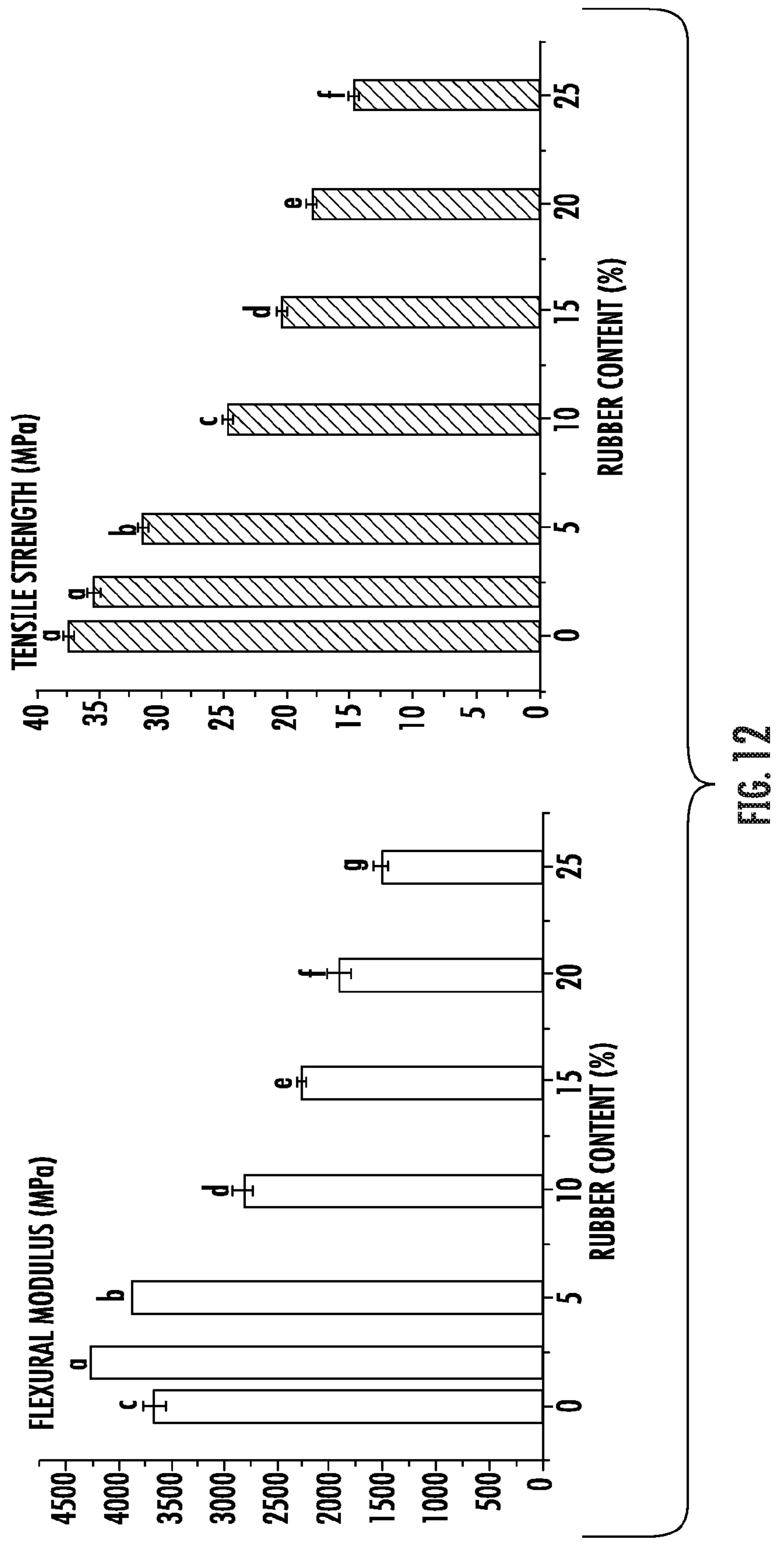
FIG. 12 show plots illustrating the average values for various mechanical properties (flexural modulus, tensile strength, tensile elongation, and notched impact strength) of the PHBV/NR blends and pristine PHBV. Means sharing the same letter are not significantly different at $\alpha=0.05$.
Figure 12:
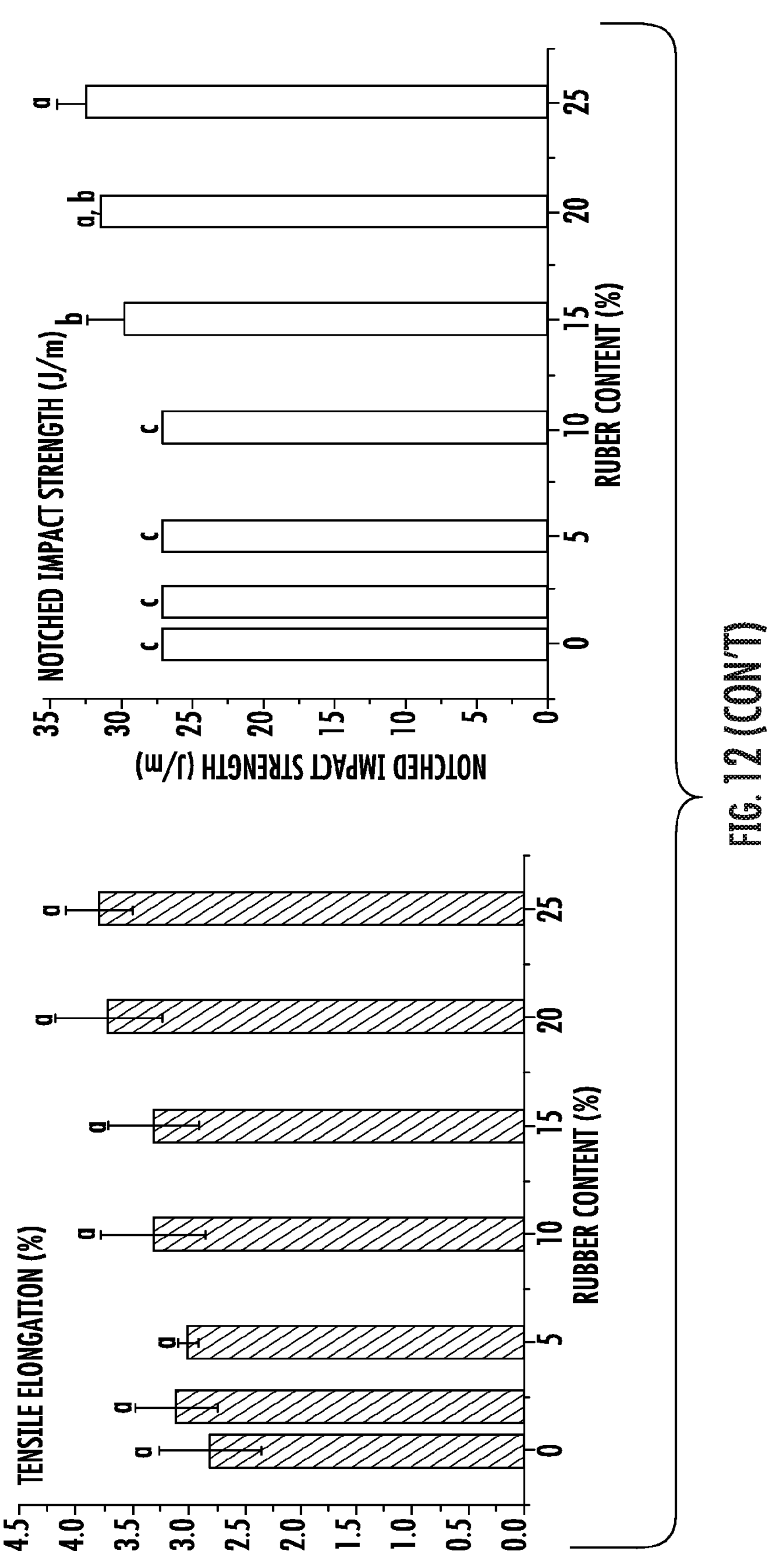

The difference between onset crystallization temperature ($T_{c(onset)}$) and peak crystallization temperature ($T_{c(peak)}$) relates to the rate of crystallization: the lower the $T_{c(onset)}$-$T_{c(peak)}$, the greater the crystallization rate. The $T_{c(onset)}$-$T_{c(peak)}$ values of the blends were generally lower than for pure PHBV, indicating that the blends had a lower crystallization rate which may explain the lower overall crystallinity (Table 1). Small rubber molecules or globules could act as nuclei at the PHBV interface, and increasing rubber content could lead to the formation of larger rubber droplets (FIG. 4). This would cause a lower interfacial contact area between the PHBV matrix and rubber phase, and decreased crystallinity. However, there is a trade-off in properties: the confined crystallization ability of PHBV in the NR blends improves low-temperature flexibility, which is favored for its packaging applications, but also reduced strength and modulus of the blends (FIG. 12). Similar results can be observed blends of PHBV/PBAT/epoxidized NR (ENR). Nonetheless, the blends were still highly crystalline and exhibited high tensile strength (FIG. 12) comparable to some of the commercial packaging plastics such as PP (22-34 MPa) and HDPE (14.5-38 MPa).

Figure 5A:
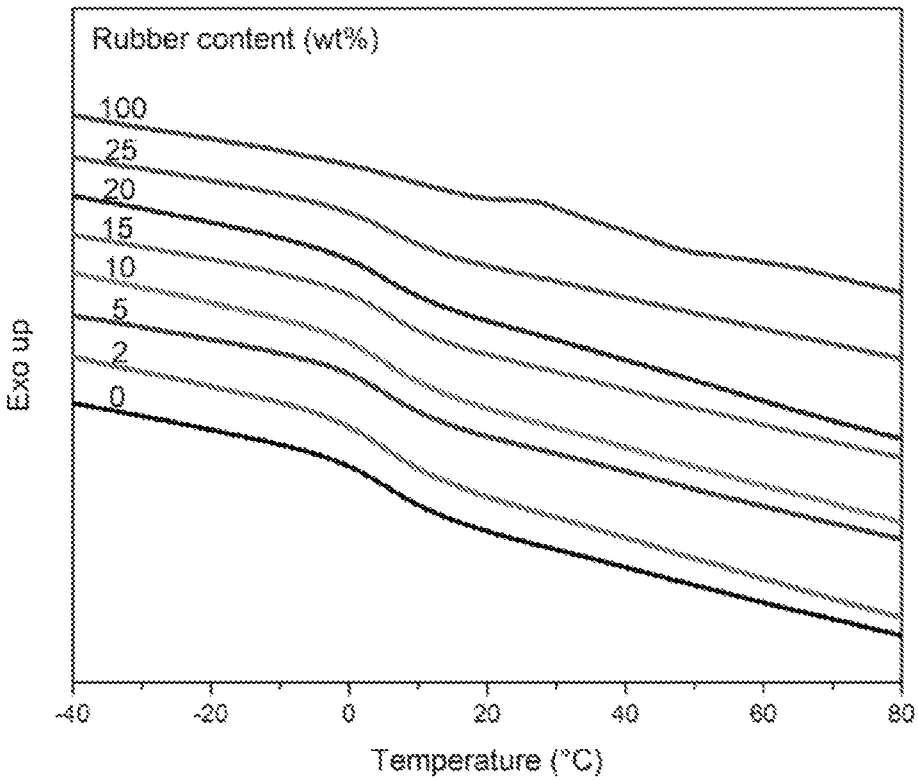
FIGS. 5A-5B compare the glass transitions of the PHBV phase (FIG. 5A) and the rubber phase (FIG. 5B) in PHBV/NR blends containing various quantities of rubber (cured by 2 phr organic peroxide 101XL45) determined from second DSC heating at 10° C. $min^{-1}$.
Figure 5B:
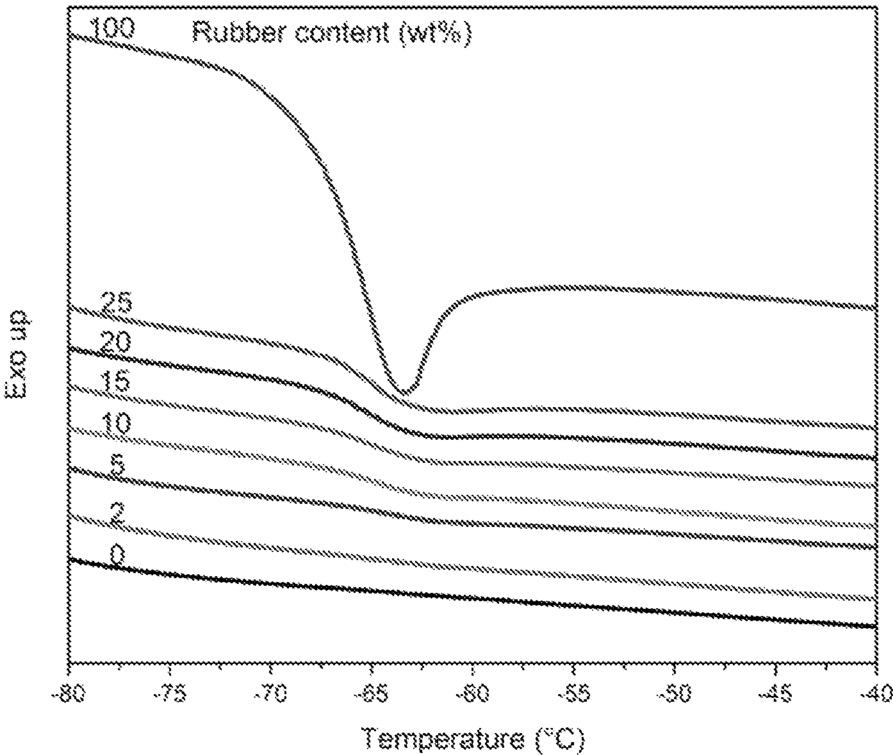

The blends had two glass transition temperatures ($T_g$), near −65 and 5° C., which correspond to the $T_g$ of the NR and PHBV, respectively (FIG. 5), indicating the presence of two phases in the blends. Although no obvious change was observed in the PHBV phase $T_g$, the NR $T_g$ was slightly elevated in the blends, indicating partial miscibility, which may be caused by NR molecular chain grafting and entangling with PHBV polymer chains, between the inherently non-miscible PHBV and NR phases. This was not apparent when PP was blended with styrene-butadiene rubber (SBR) where the SBR $T_g$ decreased, possibly due to the rubber phase contracting during the cooling process and causing the increase in the free volume. Nonetheless, even separated rubber microphases dispersed in the plastic matrix improved flexibility and toughness of PHBV (FIG. 12) by rubber particles absorbing fracture energy through cavitating, acting as stress concentrators and causing shear yielding of the plastic matrix.

Compatibility and Phase Morphology

Gel Content. Pure PHBV cured with 2 phr peroxide did not form gel (Table 2), indicating that peroxide did not crosslink PHBV. In contrast, gel was formed in the PHBV/NR blends, suggesting that the peroxide free radicals were more interactive with the double bonds in NR than in PHBV, probably due to their accessibility. The measured gel fractions closely matched the rubber content of blends at 10-25% rubber loadings, suggesting that most of the rubber in the blends was crosslinked. However, the 2-5% rubber loaded blends had gel contents much higher than the corresponding rubber content. It is possible that excess peroxide free radicals reacted with PHBV and then the resultant PHBV radicals, which could not react with each other (no gel at 0% rubber) reacted with rubber, forming PHBV graft. The PHBV grafted onto rubber polymers would become part of the crosslinked rubber network and increase the gel fraction. This may also occur in the higher rubber content blends but would not be separately detected.

TABLE 2

Gel fraction of PHBV/NR blends and PHBV (2 phr peroxide 101XL45 cured)

| Sample | Pristine PHBV | Peroxide cured PHBV | 98/2 Blend | 95/5 Blend | 90/10 Blend | 85/15 Blend | 80/20 Blend | 75/25 Blend |
|---|---|---|---|---|---|---|---|---|
| Gel (wt. %) | 0 | 0 | 31.4 ± 0.2 | 15.2 ± 0.1 | 7.1 ± 2.3 | 16.1 ± 4.9 | 13.0 ± 5.0 | 25.8 ± 1.8 |

Figure 6:
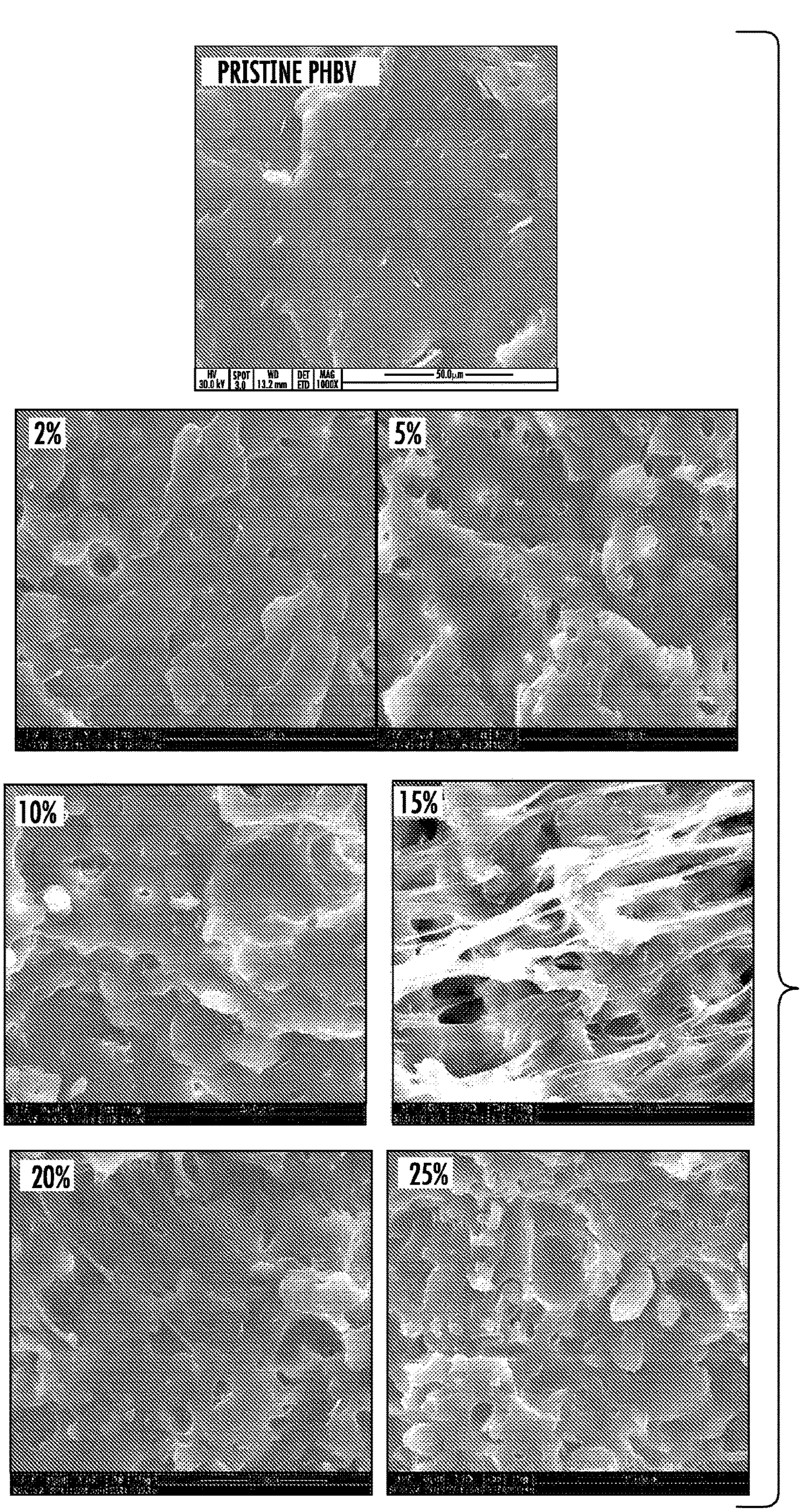
FIG. 6 shows SEM micrographs of pristine PHBV and PHBV/NR blends containing various quantities of rubber (cured by 2 phr organic peroxide 101XL45). The rubber loading (in weight percent) is indicated in the top left of each micrograph.

Scanning Electron Microscopy (SEM). Pristine PHBV had a relatively smooth surface, with some voids, which is typical of brittle materials (FIG. 6). The PHBV/NR blends had a much rougher surface, indicative of their improved toughness, and lack of two distinct phases suggests adhesion between the PHBV and NR phases. The fibrils observed in the 15% and 20% blends are evidence of ductile fracture of these blends and support an intimate PHVB/NR interactive network. Their absence in the 25% rubber loaded blend may reflect a less homogenous composition in this blend. The improved toughness of the blends over pristine PHBV was reflected in the improved notched impact strength (FIG. 12), which will be discussed later.

Figure 7:
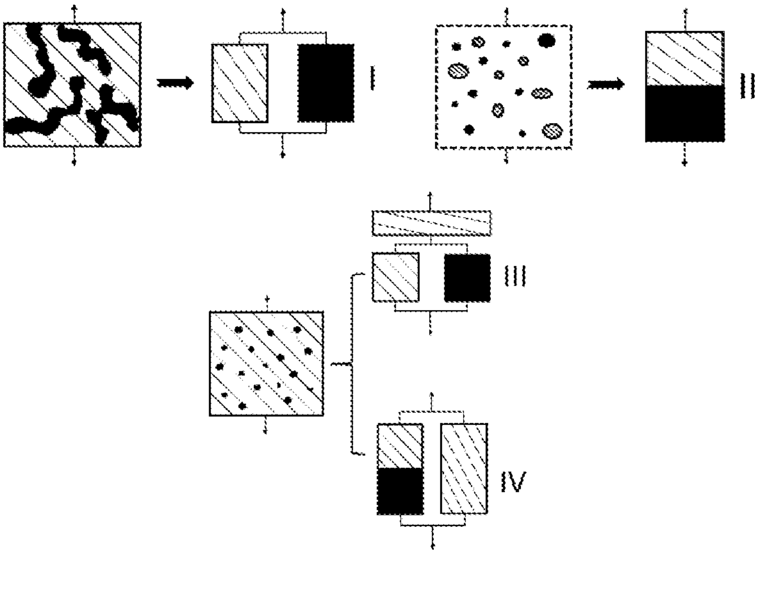
FIG. 7 shows simplified depictions of the mixing state of the PHBV/NR blends and their corresponding Takayanagi models. I. co-continuous phases, II. both non-continuous, III. continuous PHBV and non-continuous rubber with good bonding between the two phases, IV. continuous PHBV and non-continuous rubber with poor bonding between the two phases.

Rubber-Plastic Continuity Analysis. As discussed above, a two-phase system was formed in the PHBV/NR blends with clear rubber loading-dependent differences in chemical and physical behavior. Possible constructions of the different PHBV-NR blends include: 1. both phases are continuous, 2. both phases are discontinuous, 3. discontinuous rubber dispersed in continuous PHBV, with good compatibility, and 4. discontinuous rubber dispersed in continuous PHBV, with poor compatibility. Therefore, Takayanagi's. viscoelastic models were applied to analyze the elastic moduli and rubber-plastic continuity of the binary blends. In co-continuous systems, the applied force passes through the two phases in parallel (FIG. 7, I), while in non-continuous systems the force passes through the two phases in series (FIG. 7, II). The upper and lower limit of the corresponding elastic modulus (E) of the different binary blend systems can be calculated from the following:

$$E_{max} = \varphi_1 E_1 + \varphi_2 E_2 \quad \text{(I)}$$

$$E_{min} = \frac{1}{\frac{\varphi_1}{E_1} + \frac{\varphi_2}{E_2}} \quad \text{(II)}$$

where $E_{max}$ and $E_{min}$ are the upper and lower limit of the modulus, $E_i$ is the elastic modulus of component i, $\varphi_i$ is the volume fraction of component i.

In discrete rubber and continuous PHBV with good bonding, the force passes through PHBV in series with force passing in PHBV and rubber in parallel (FIG. 7, III) and can be described ac $$E_{blend} = \frac{1}{\frac{\varphi}{\lambda E_{rubber} + (1-\lambda)E_{PHBV}} + \frac{1-\varphi}{E_{PHBV}}} \quad \text{(III)}$$

where $E_{blend}$, $E_{rubber}$, and $E_{PHBV}$ represent the elastic modulus of the PHBV/NR blend, NR, and PHBV, respectively, $\lambda$ is the volume fraction of the discontinuous phase consisting of both components PHBV and NR, 1-$\lambda$ is the volume fraction of the continuous phase, $\varphi$ is the fraction of the NR component in the discontinuous phase, $\lambda\varphi$ is the volume fraction of NR in the discontinuous phase.

In discrete rubber and continuous PHBV with weak bonding, the force passes through PHBV in parallel with force passing in both PHBV and rubber in series (FIG. 7, IV) and can be described as $$E_{blend} = \frac{\lambda}{\frac{\varphi}{E_{rubber}} + \frac{1-\varphi}{E_{PHBV}}} + (1-\lambda)E_{PHBV} \quad \text{(IV)}$$

where $E_{blend}$, $E_{rubber}$, and $E_{PHBV}$ are the elastic modulus of the PHBV/NR blend, NR, and PHBV, respectively, $\lambda$ is the volume fraction of the discontinuous phase consisting of both components PHBV and NR, 1-$\lambda$ is the volume fraction of the continuous phase, $\varphi$ is the fraction of the NR component in the discontinuous phase, and $\lambda_\varphi$ is the volume fraction of NR in the discontinuous phase.

Figure 8:
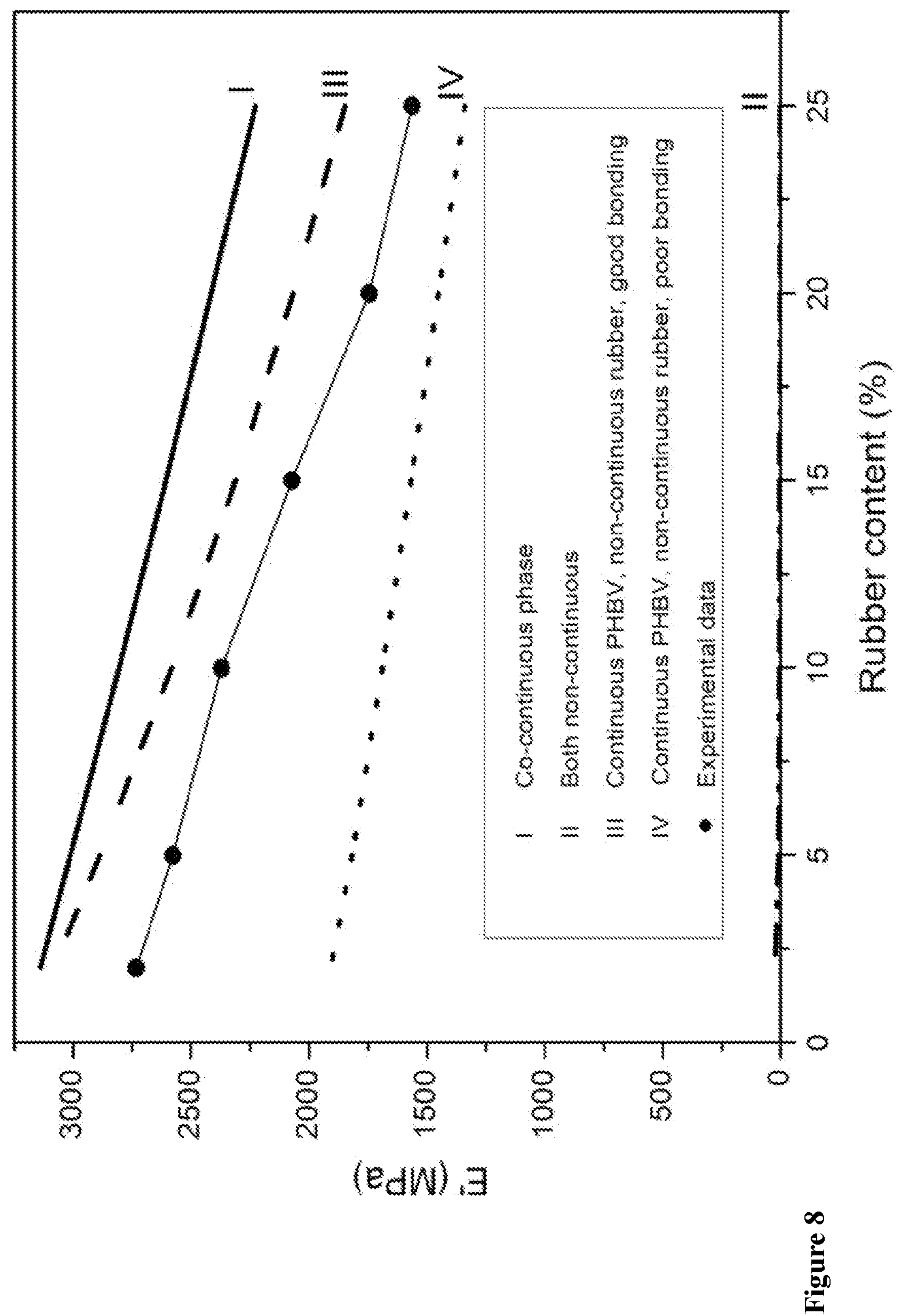
FIG. 8 is a plot comparing the elastic modulus of PHBV/NR blends compared to predictions from Takayanagi models.

For equations III and IV, when the dispersed particles are spheric, $\lambda=(2+3V_2)/5$ and $\varphi=5V2/(2+3V_2)$, where V2 is the volume fraction of NR in the blends. The experimental storage modulus data from the different blends fall between the values predicted by models III and IV, indicating that the blends contained discrete rubber particles dispersed in a continuous PHBV matrix (FIG. 8). However, at the lower 2-15% NR loadings, the elastic modulus behavior favored model III, reflecting the gel formation in 2-5% NR (Table 2) and interfacial adhesion between the two phases in the corresponding blends. Blends with 10 and 15% NR most closely adhered to model III, but as NR content increased beyond 15% the elastic modulus trended toward model IV, indicating weakening bonding between the two phases. This was also observed by TEM where the 15% NR blend had better interfacial adhesion between the two phases than the high NR content blends. At the higher NR contents, larger NR particles can form which can weaken instead of strengthening interfacial adhesion. As PHBV and NR are inherently immiscible due to entropy constraints (strong polarity differences), the interfacial adhesion existing between the two phases is probably caused by polymer crosslinking, at low loadings including PHBV grafts onto NR, while at high loadings these are probably mostly NR-NR crosslinks. PHBV molecules may entangle across PHBV and NR interfaces and lock in loops inside the NR network. The restricted crystallization behavior of the PHBV in the blends observed in DSC was partially caused by restricted movement of the PHBV molecular chains locked within localized NR networks.

Figure 9A:
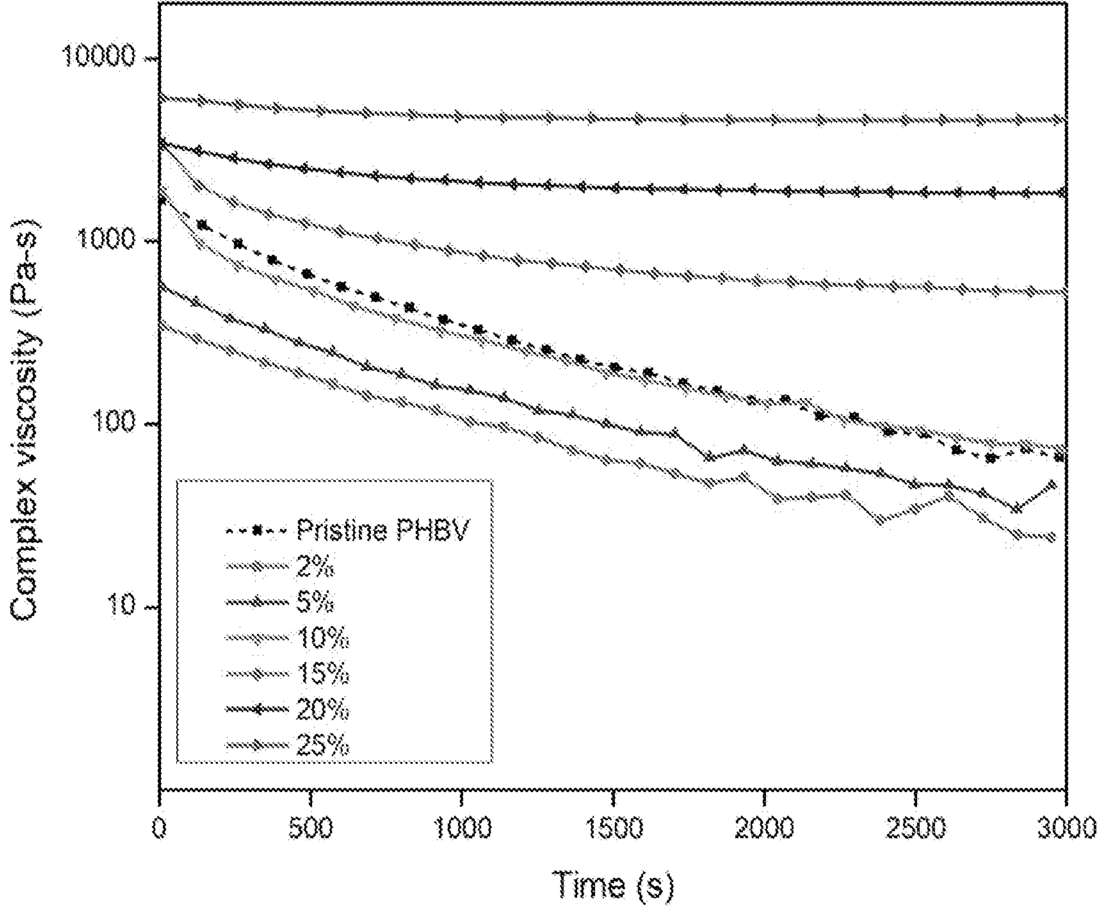
FIGS. 9A-9B are plots comparing the complex viscosities of PHBV/NR blends measured using a time sweep (FIG. 9A) and a frequency sweep (FIG. 9B) at 175° C. The rubber loading of each sample (in weight percent) is indicated in the figure legend.

Rheology. Viscosity in time and frequency sweeps (FIG. 9A) of the 10% NR blend closely matched PHBV alone but decreased at lower NR loadings and increased at higher ones. Similar results were found in blends of PP/high density polyethylene (HDPE) (90/10) with ethylene propylene diene monomer rubber (EPDM). The decreased melt viscosity of PHBV at low NR may have been caused by the NR acting as an emulsifier as with EPDM which can cause molecular alignments and disentanglements. The increased viscosity of PHBV at higher rubber loading (15-25%) was probably due to increased formation of entanglement-derived locked-in loops of PHBV in localized NR networks and possible grafting of PHBV to rubber. The low melt viscosity and melt strength make PHBV too fluid to sustain its shape during thermal processing. The enhanced viscosities of the higher NR content PHBV blends are comparable to some commercial packaging materials, such as PP (600 Pa·s).

Figure 9B:
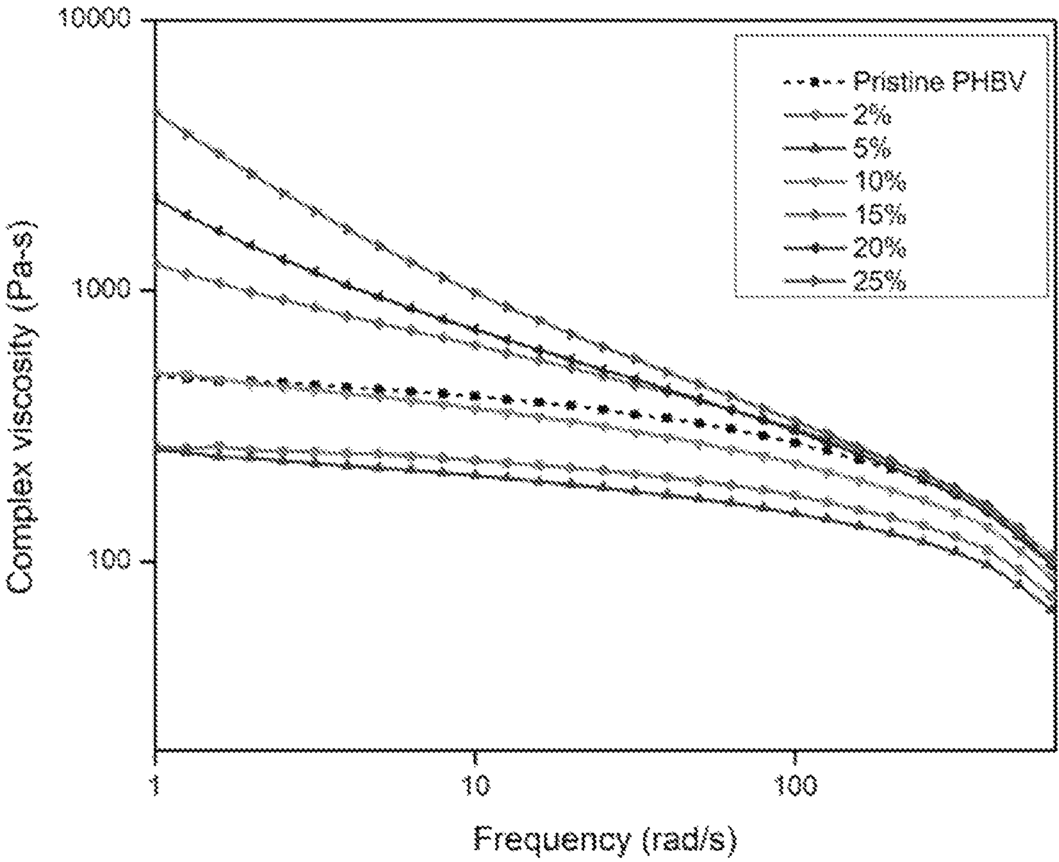

The viscosity of the 15-25% NR loaded blends was more stable over time than that of the pure PHBV or the 2-10% NR blends (FIG. 9B). Decreased viscosity may relate to PHBV thermal degradation, but increased NR helped dissipate heat more efficiently in the blend, retarding degradation during heating and extrusion or injection molding processes. All the samples showed shear-thinning behavior, typical of non-Newtonian fluids, caused by breakdown of entanglements between the polymer chains. The larger number of entanglements in the higher rubber loadings explains the more pronounced sheer thinning observed (FIG. 9B). Shear-thinning behavior can benefit polymer processing because only small adjustments in processing pressure are needed to modify the melt flow rate.

Figure 10A:
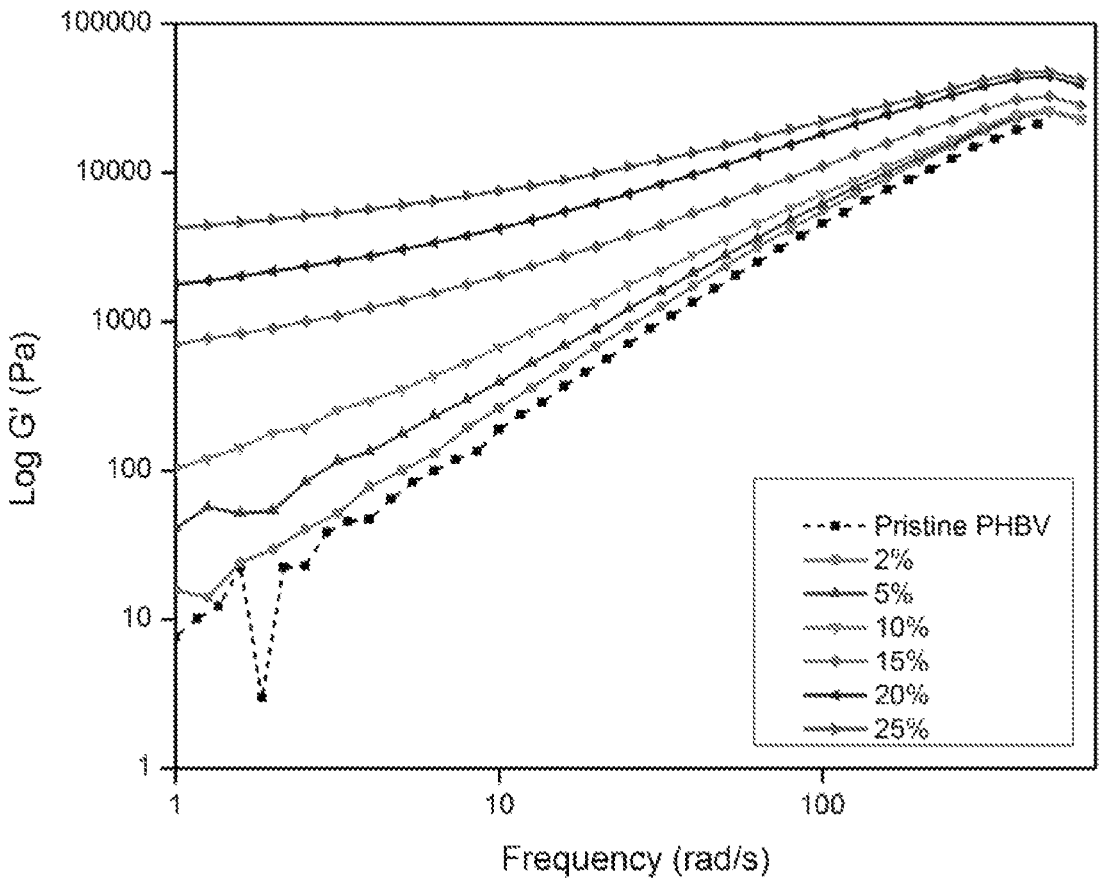
FIGS. 10A-10B are plots comparing the storage moduli G' (A) and loss moduli G" (B) of PHBV/NR blends at 175° C. The rubber loading of each sample (in weight percent) is indicated in the figure legend.
Figure 10B:
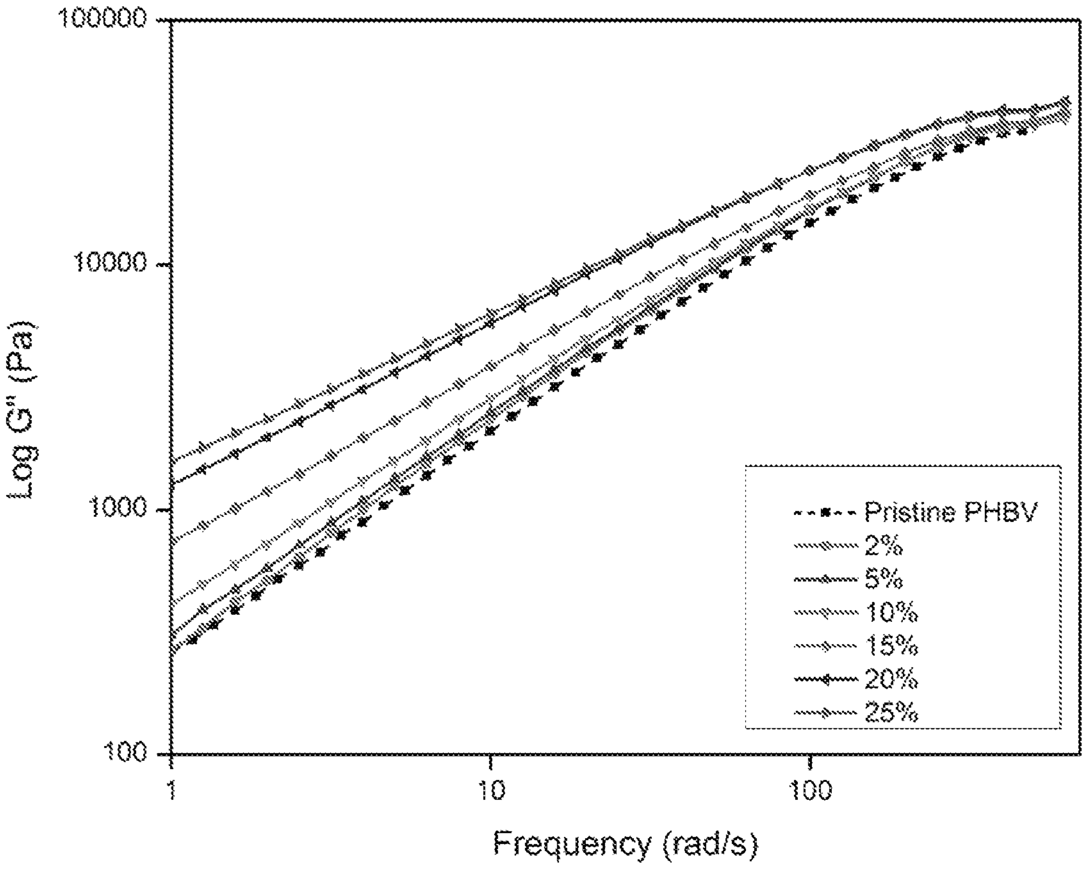
Figure 11:
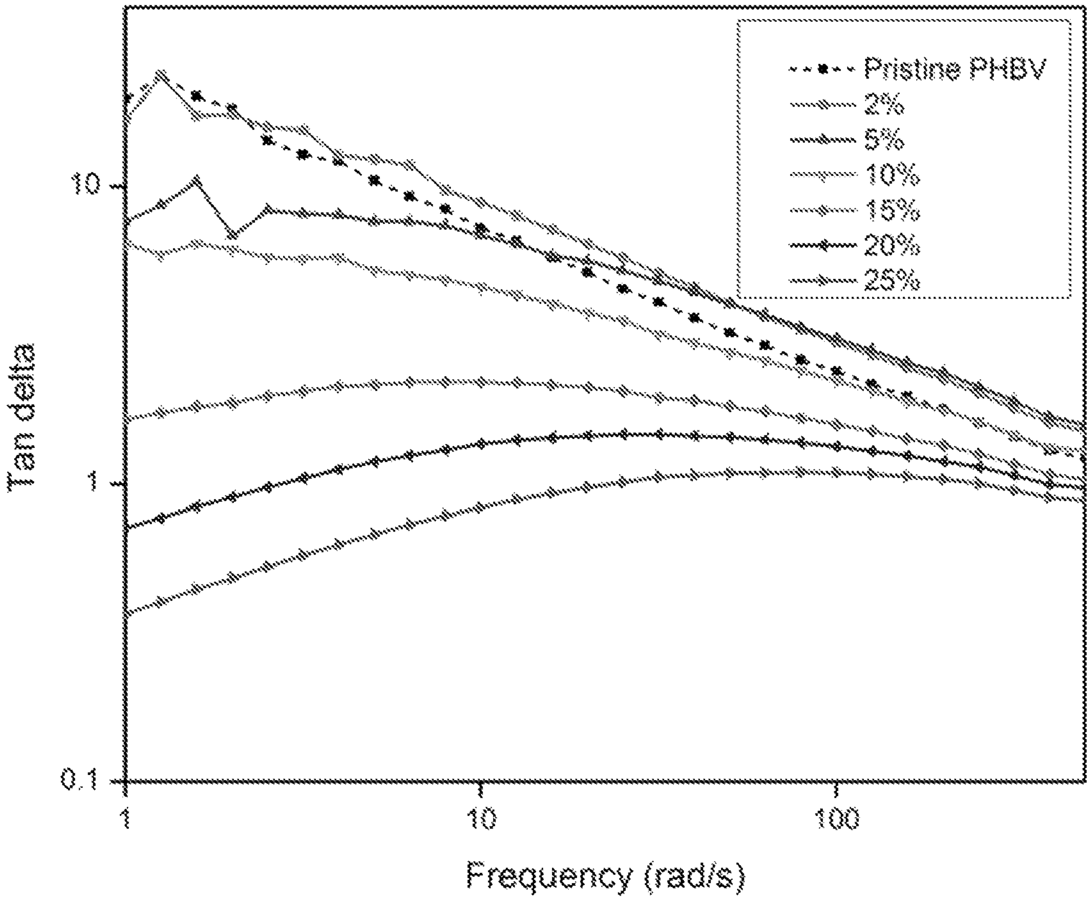
FIG. 11 is a plot showing the Tan delta of the PHBV/NR blends at 175° C. The rubber loading of each sample (in weight percent) is indicated in the figure legend.

The PHBV/NR blends are viscoelastic, combining storage moduli (G', reversible elastic deformation) and loss moduli (G", irreversible viscous flow) (FIG. 10A and FIG. 10B). At lower frequencies, both the storage and loss modulus increased with increasing NR loading, but G" decreased more than G' (data not shown), indicating increasing elasticity caused by the NR, and the formation of more entanglement structures. Tan 8, the ratio of G" to G', decreased with increasing rubber loading (FIG. 11), indicating higher stored energy in the melt, higher melt elasticity, and higher melt strength. Thus, the PHBV/NR materials are better able to retain their shape as extruded or thermoformed products than PHBV.

Mechanical Performance

Flexibility. Lack of flexibility (brittleness) has limited PHBV's utility in packaging. PHBV flexural modulus increased (i.e. flexibility decreased) when small amounts of NR were added (2-5%) (FIG. 12). NR at low concentration doesn't agglomerate into larger particles so has a strong nucleating ability and large interfacial area between rubber and PHBV. The subsequent formation of crystallites combined with the increase in gel content (Table 2) increased the stiffness of these PHBV/NR blends. However, stiffness declined at higher NR loadings, up to 59% in the 25% NR blend. The lower modulus and crystallinity of the higher NR blends (FIG. 12) are comparable to PS (flex modulus ~3000 MPa, crystallinity 20-40%) and HDPE (flexural modulus ~1000 MPa) used in commercial packaging materials. It should be noted that flexibility was improved at the expense of flexural strength (data not shown) likely due to the insufficient interfacial bonding between PHBV and rubber.

Figure 13:
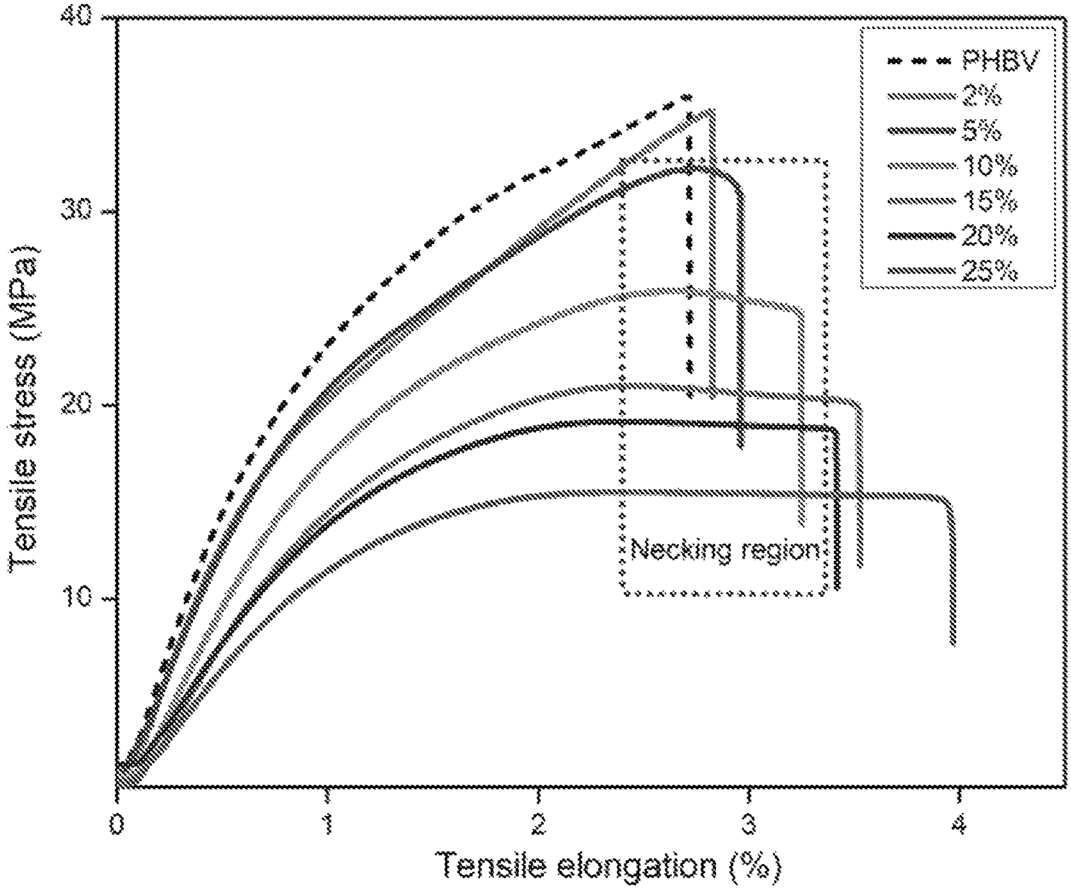
FIG. 13 is a plot showing stress-elongation curves of PHBV/NR blends and pristine PHBV. The rubber loading of each sample (in weight percent) is indicated in the figure legend.

Tensile Properties. In addition to conferring flexibility to the rigid polymer matrix, rubber domains create stress concentrations in the blends, leading to yield or breakage at lower stresses in the native polymer. Neither the pure PHBV nor the 2% NR blend exhibited a yield point or strain-hardening on their stress-elongation curves (FIG. 13), which is typical for brittle materials and plastics. However, all of the 5-25% NR blends had a necking region on the stress-elongation curve (FIG. 13), indicating ductile fracture of the materials. NR loading lowered tensile stress and Young's modulus due to the softening effect of the rubber and voids formed in the blends, as seen in PHBV/NR latex and PHBV/NR gel (HMW-NR) blends. NR only slightly increased PHBV tensile elongation (FIG. 13) in contrast to the increased tensile elongation found for PHBV blended with NR latex, and ENR. This is because PHBV and natural rubber are inherently immiscible. Although addition of peroxide improved the compatibility between the two phases, the interfacial adhesion was still not strong enough for efficient stress transfer from PHBV to rubber under tension. Hence the tension elongation of the blend did not show much improvement. Thus, in the current PHBV/NR blends the materials behaved more like PHBV than NR with respect to this trait, due to the size distribution and dispersion of the rubber, in the continuous PHBV phase.

Impact Resistance Properties. A package undergoes rapid deformation when it is dropped or when another object impacts it. Thus, packaging should possess sufficient toughness (impact resistance) to not crack or rupture as kinetic energy is dissipated by matrix yielding and crazing. Toughness, measured by notched impact strength, was improved at NR loadings above 10% (FIG. 12), becoming similar to PS and PLA. In the PHBV/NR blends, rubber particles concentrate the stress and when the stress exceeds the plastic's yield stress, the plastic molecules around the particles align and shear yield. The NR-induced toughening relies on there being sufficient rubber to overlap stress fields and contribute to a growing shear-yielding region. Rubber particles at low concentration (2-10%) are too distant from each other to initiate sufficient stress concentration. Shear yielding and initiation of shear bands are both energy absorbing process, and optimal particle size and short particle-to-particle distance both contribute to maximize energy absorption and material toughness.

Conclusion

New PHBV-based materials have been evaluated that overcome the inherent physical drawbacks of pure PHBV which have prevented its widespread substitution of petroleum-based plastics, included in food packages. Blends of PHBV containing 10-15% NR provide a desirable combination of processing and performance properties. The resulting plastics perform similarly to conventional plastics, such as polyolefins. It is possible that these blends can be used to manufacture, for example, bio-based freezer-to-microwave food packaging which would be compostable.

The compositions and methods of the appended claims are not limited in scope by the specific compounds, compositions, and methods described herein, which are intended as illustrations of a few aspects of the claims. Any compounds, compositions, and methods that are functionally equivalent are intended to fall within the scope of the claims. Various modifications of the compounds, compositions, and methods in addition to those shown and described herein are intended to fall within the scope of the appended claims. Further, while only certain representative compounds, components, compositions, and method steps disclosed herein are specifically described, other combinations of the compounds, components, compositions, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A polymeric composition comprising a blend comprising:

a polyhydroxyalkanoate polymer comprising poly(3-hydroxybutyrate-co-3-hydroxypropionate), poly(3-hydroxybutyrate-co-4-hydroxybutyrate), poly(3-hydroxybutyrate-co-4-hydroxyvalerate), poly(3-hydroxybutyrate-co-3-hydroxyvalerate), poly(3-hydroxybutyrate-co-3-hydroxyhexanoate), poly(3-hydroxybutyrate-co-5-hydroxyvalerate), poly(3-hydroxybutyrate-co-6-hydroxyhexanoate), or combinations thereof; and a rubber polymer, wherein the rubber polymer comprises natural rubber other than epoxidized natural rubber (ENR);

wherein the blend is formed by melting the polyhydroxyalkanoate polymer and the rubber polymer in the presence of a free radical initiator.

2. The composition of claim 1, wherein the rubber polymer is present in the blend in an amount of from 1% to 40% by weight, based on the total weight of all polymers present in the blend.

3. The composition of claim 1, wherein the polyhydroxyalkanoate polymer is present in the blend in an amount of from 60% to 99% by weight, based on the total weight of all polymers present in the blend.

4. The composition of claim 3, wherein the polyhydroxyalkanoate polymer comprises poly(3-hydroxybutyrate-co-3-hydroxyvalerate).

5. The composition of claim 4, wherein the poly(3-hydroxybutyrate-co-3-hydroxyvalerate) comprises from 99 mol % to 85 mol % 3-hydroxybutyrate and 1 mol % to 15 mol % 3-hydroxyvalerate.

6. The composition of claim 1, wherein the blend is formed by reactively extruding a mixture comprising the polyhydroxyalkanoate polymer, the rubber polymer, and a free radical initiator.

7. The composition of claim 1, wherein the free radical initiator comprises a peroxide.

8. The composition of claim 1, wherein the free radical initiator is present in an amount from 0.1 to 5 parts per hundred rubber.

9. The composition of claim 1, wherein the renewable carbon content of the blend is at least 50% by weight, as measured according to the standard method described in ASTMD6866-18.

10. The composition of claim 1, wherein the blend exhibits at least two distinct glass transition temperatures.

11. The composition of claim 1, wherein the blend exhibits:

a flexural modulus of less than 3250 MPa as measured according to the standard method described in ASTM D790-15;

a flexural modulus of from 750 MPa to 3250 MPa as measured according to the standard method described in ASTM D790-15;

a tensile strength of from 12 MPa to 33 MPa as measured according to the standard method described in ASTM D638-08;

a notched impact strength of at least 28 J/m as measured according to the standard methods described in ASTM D256-10;

a degree of crystallinity of from 50% to 70%, as determined by differential scanning calorimetry (DSC);

or a combination thereof.

12. The composition of claim 1, wherein neat polyhydroxyalkanoate polymer exhibits a melting temperature and the blend exhibits a melting temperature, and wherein the melting temperature of the blend is at least 2° C. less than the melting temperature of the neat polyhydroxyalkanoate polymer.

13. The composition of claim 1, wherein neat polyhydroxyalkanoate polymer exhibits an onset crystallization temperature and the blend exhibits an onset crystallization temperature, and wherein the onset crystallization temperature of the blend is at least 2° C. less than the onset crystallization temperature of the neat polyhydroxyalkanoate polymer.

14. The composition of claim 1, wherein the composition is compostable, as determined by ASTM D6400-19.

15. An article comprising the composition of claim 1.

16. The composition of claim 1, wherein the rubber polymer does not comprise epoxidized natural rubber.

* * * * *